(12) United States Patent
Valette

(10) Patent No.: US 7,031,611 B2
(45) Date of Patent: Apr. 18, 2006

(54) OPTICAL ROUTERS USING ANGULAR POSITION AMPLIFICATION MODULES

(75) Inventor: Serge Valette, Grenoble (FR)

(73) Assignee: Teem Photonics, Meylan (FR)

( * ) Notice: Subject to any disclaimer, the term of this patent is extended or adjusted under 35 U.S.C. 154(b) by 0 days.

(21) Appl. No.: 10/469,584

(22) PCT Filed: Mar. 1, 2002

(86) PCT No.: PCT/FR02/00756

§ 371 (c)(1),
(2), (4) Date: Mar. 5, 2004

(87) PCT Pub. No.: WO02/071792

PCT Pub. Date: Sep. 12, 2002

(65) Prior Publication Data

US 2004/0136710 A1    Jul. 15, 2004

(30) Foreign Application Priority Data

Mar. 1, 2003  (FR) .................................. 02/00756

(51) Int. Cl.
*H04J 14/00* (2006.01)
*H04J 14/02* (2006.01)
(52) U.S. Cl. ............................ 398/96; 398/49; 398/55; 398/82
(58) Field of Classification Search .................. 398/43, 398/45, 68, 48–50, 79, 55–57, 86, 82–84, 398/87, 96
See application file for complete search history.

(56) References Cited

U.S. PATENT DOCUMENTS 5,495,356 A    2/1996  Sharony et al.
5,671,304 A *  9/1997  Duguay .................. 385/17
5,936,752 A *  8/1999  Bishop et al. ............ 398/90
6,097,859 A *  8/2000  Solgaard et al. .......... 385/17

(Continued)

FOREIGN PATENT DOCUMENTS

EP    0 921 702    6/1999

(Continued)

OTHER PUBLICATIONS

Li Y et al: "Optical Nonblocking Multicast and Broadcast Interconnects Using Multidimensional Multiplexing Concepts", Journal of Lightwave Technology, IEEE. New York, US, vol. 14, No. 2, Feb. 1, 1996, pp. 129-138.

(Continued)

*Primary Examiner*—Leslie Pascal
*Assistant Examiner*—Dalzid Singh
(74) *Attorney, Agent, or Firm*—Young & Thompson

(57) ABSTRACT

An optical routing device for coupling each of a plurality $N_E$ of optical incoming channels (1) to one of a plurality $N_S$ of optical output channels (5) and for orienting each of the optical beams coming through the incoming channels to any one of the $N_S$ optical output channels, includes: an input module including $N_E$ optical inputs, for shaping each beam, so as to obtain a plurality of shaped optical beams; an input deflection module for generating for each input a number $P_{TN}$ of different positions of angular deflection at least equal to the number $N_S$ of optical output channels; a linking module for assembling in bi-unique manner on $P_{TN}$ spatial focusing points, respectively the $P_{TN}$ angular deflection positions of each; an output deflection module having $P_{TN}$ inputs for intercepting $P_{TN}$ intermediate optical beams; and an optical output module for shaping each $N_S$ output beam.

39 Claims, 15 Drawing Sheets

U.S. PATENT DOCUMENTS

| | | | |
|---|---|---|---|
| 6,128,113 A | 10/2000 | DeMartino | |
| 6,345,133 B1 * | 2/2002 | Morozov | 385/24 |
| 6,434,291 B1 * | 8/2002 | Kessler et al. | 385/24 |
| 6,634,810 B1 * | 10/2003 | Ford et al. | 398/88 |

FOREIGN PATENT DOCUMENTS

| WO | WO 01/07945 | 2/2001 |
|---|---|---|

OTHER PUBLICATIONS

Lin et al: "Micro-electro-mechanical systems (MEMS) for WDM optical-crossconnect networks" Military Communications Conference Proceedings, 1999. MILCOM 1999. IEEE Atlantic City, NJ, USA Oct. 31-Nov. 3, 1999, Piscataway, NJ, USA, IEEE, US, Oct. 31, 1999, pp. 954-957.

* cited by examiner

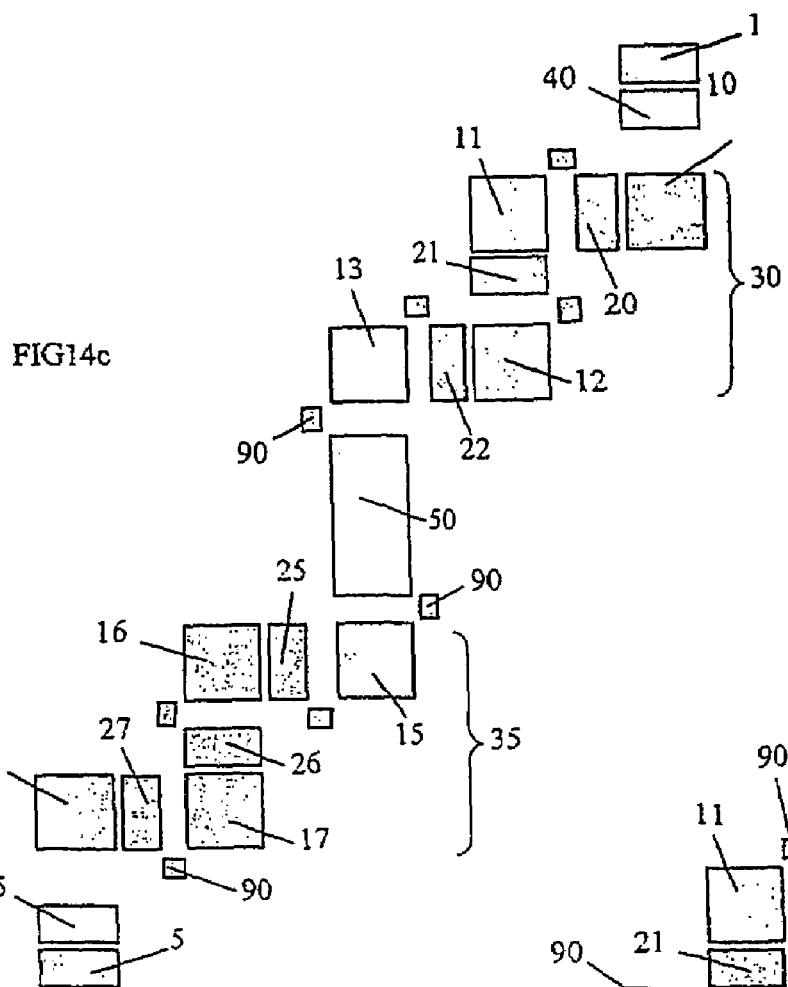
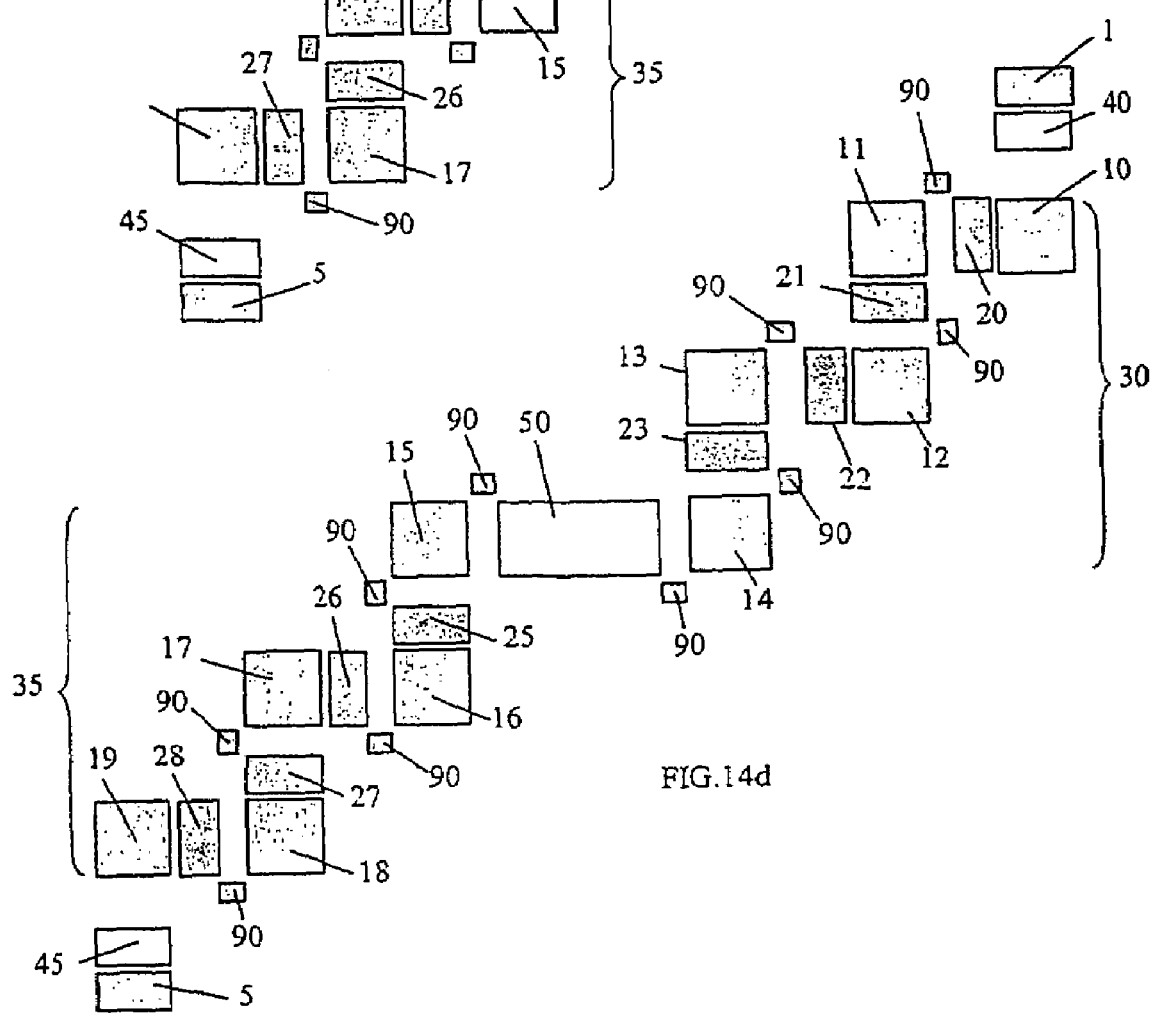
FIG14c
FIG.14d

Input elements

Output elements

OPTICAL ROUTERS USING ANGULAR POSITION AMPLIFICATION MODULES

1. TECHNICAL FIELD

The invention relates to the routing and crossconnecting of optical data emanating from a plurality of incoming channels, particularly data transported by fiber-optic telecommunication networks.

The invention may apply to all fields in which light signals, whether or not transported by optical fibers, have to be spatially redirected and redistributed.

2. PRIOR ART

The use of all-optical routers has become an enormous challenge in fiber-optic telecommunication systems because of the increasing number of connections to be managed, the number of wavelengths involved and the increasing modulation frequencies of the optical carriers, which at the present time may be up to 40 Gbit/s.

This trend in fact makes conventional electronic routing (that requires a prior optical/electronic conversion followed, after electronic routing, by the reverse, electronic/optical, conversion) increasingly difficult.

The current solutions divide into solutions using integrated optics (Agilent, ATT, etc.) and those using optical microsystems also called MOEMS (Micro-Opto-Electro-Mechanical Systems), in particular from Lucent and Xross (see the references).

The invention falls within this latter category with, as in the prior art, the favorable (but unnecessary) use of micromirrors produced by microtechnology techniques as deflection means.

It differs by the optical architecture that allows the routing function to be carried out and, when micromirrors are used as deflection means, by the type and by the mode of operation of the micromirrors that may be involved. The invention makes it possible to overcome most of the difficulties encountered in the routers of the prior art.

This is because the solutions currently under study and illustrated in their operating principle by FIG. 1 require the use of analog-control micromirrors with two movable parts capable of directing the deflected optical beams in all directions in space (angles $\theta$ and $\Phi$).

These solutions therefore require only two reflections of analog-control moving mirrors to carry out the routing operation. They are often employed with a single matrix of analog micromirrors 100 and a fixed deflection mirror 105, as shown in FIG. 1, the incoming fibers 1 and outgoing fibers 5 then being grouped into a single matrix 110.

Such solutions appear, on paper, to be extremely simple and elegant but they have three shortcomings:

- analog-control micromirrors with two movable parts are difficult to produce technologically and the manufacturing yields for matrices of such micromirrors seem at the present time to be very low and unsatisfactory;
- the indispensable analog control requires very complex electronic servocontrol means that are difficult to manage and it consumes a not insignificant amount of power;
- the angular excursions of each micromirror have to be large, and become larger the higher the number of points involved, which further complicates the fabrication technology. This also leads to high control voltages, which, on the one hand, is prejudicial to electrical control and which, on the other hand, produces parasitic interference difficult to overcome when controlling closely spaced mirrors; and
- finally, should there be a power cut, the use of analog mirrors results in a loss of configuration of the network, which may be highly prejudicial.

The solution of the invention, illustrated schematically by FIG. 2, gets round these four difficulties when it involves cascades of optical beam deflection means $DM^1$, $DM^2$, $DM^3$, ... $DM^i$, ... $DM^N$ composed of deflection elements, that here are of the preferably digital micromirror type, the deflection positions of which are stable and perfectly reproducible and which require no electronic servocontrol.

The production of such mirrors is technologically simpler and can give excellent manufacturing yields. Moreover, since the angular excursion of such mirrors may be small (for example between 0.5 and 4°), the control voltages may be reduced.

In addition, the architecture involved in which, as we will see in the rest of the description, each deflection element of the cascade is optically conjugated with the mirror of the cascade that precedes it and which follows it by an object-image relationship, thereby ensuring excellent stability of the alignment of the system.

It also results in a very high degree of modularity, as the same types of deflection means (micromirrors or the like) may be used to produce routers of increasing complexity by simply increasing the number of elements making up the deflection means and the number of deflection means (that favorably are identical) of the cascade.

Finally, it is compatible, even for routers of great complexity, with the use of any means of deflecting optical beams that allow at least two deflection positions to be obtained.

It should be noted that the advantageous use of such cascades assumes that it is possible for an input optical deflection module to be effectively coupled to an output optical deflection module, something that the prior art does not always enable to be achieved in a simple and reliable manner.

3. PRINCIPLE INVOLVED IN THE INVENTION

The overall objective of the invention is to produce a device capable of directing the data transported by any number of incoming optical signals toward any number of outputs, thanks to a structure that allows the use of various deflection module structures.

For this purpose, the invention proposes an optical routing device for coupling each of a plurality $N_E$ of incoming optical channels to any one of a plurality $N_S$ of outgoing optical channels and for directing each of the optical beams entering via the incoming optical channels toward any of the $N_S$ outgoing optical channels, comprising:

- an input module having $N_E$ optical inputs, that is designed to shape each of the beams entering via the incoming optical channels so as to obtain a plurality of shaped and advantageously parallel optical beams;
- an input deflection module designed to generate, for each of the inputs, a number $P_{TN}$ of different angular deflection positions at least equal to the number $N_S$ of outgoing optical channels;
- a linking module designed to collate, in a one-to-one manner, the $P_{TN}$ angular deflection positions of each of the inputs with respect to $P_{TN}$ spatial focusing points respectively, this module being designed to generate $P_{TN}$ intermediate optical beams;

an output deflection module having $P_{TN}$ inputs, that is designed to intercept the $P_{TN}$ intermediate optical beams and to generate, from the intermediate optical beams, $N_S$ advantageously parallel output beams; and an optical output module designed to shape each of the $N_S$ output beams so as to be able to apply them to the $N_S$ outgoing channels.

The expression "shape the beams" means to produce beams whose optical characteristics meet defined specifications (for example, divergence or waist of the beams, etc.).

It will be appreciated that this overall structure offers great flexibility in choosing the deflection modules, that therefore can be of known type, especially with analog-control moving mirrors with multiple configurations, and also of the aforementioned novel type, i.e. digital-control moving mirrors arranged in cascade.

The invention lends itself to handling various types of requirements.

The most common case to be handled is that encountered at the nodes of optical telecommunication networks in which the data transported by a number $N_E$ of incoming optical fibers distributed either in a linear array of $N_E$ fibers or in matrices of $N'_E \times N''_E$ fibers has to be redirected toward $N_S$ outgoing optical fibers distributed either in linear arrays of $N_S$ fibers or in matrices of $N'_S \times N''_S$ fibers.

However, the incoming and outgoing channels may not only be fibers, but also free space, or sources such as laser diodes, etc.

Preferably, the incoming channels and the outgoing channels are parallel.

According to preferred provisions of the invention, that may possibly be combined:

the input deflection module comprises $N_E$ lines each having a plurality of deflection elements arranged in cascade and each able to adopt a plurality of angular deflection configurations numbering less than the number $P_{TN}$;

the output deflection module comprises $N_S$ lines each comprising a plurality of deflection elements in cascade and able to adopt a plurality of angular deflection configurations numbering less than the number $N_S$;

in each line, each deflection element is coupled to the preceding one by an optical conjugation element designed to carry out object-image conjugation between this deflection element and the preceding one;

each conjugation element associated with two consecutive deflection elements comprises at least two lenses in a cofocal configuration, the ratio of the focal lengths of which is equal to the desired magnification between the two deflection elements;

each optical conjugation element has a magnification:

$$G_{i,i+1} = P_i \times (P_{i+1}-1)/(P_i-1)$$

where $P_i$ and $P_{i+1}$ represent the number of angular positions that can be adopted by the i and i+1 deflection elements between which this optical conjugation element is placed;

in at least one line, the optical deflection elements have the same number of angular positions and the magnification is equal to this number;

the deflection elements are mirrors that can swivel about at least one tilt axis;

the deflection elements are mirrors that can swivel in two angular positions about each tilt axis and the magnification $G_{i,i+1}$ is equal to 2;

the homologous angular deflection elements within the lines are distributed in a number of sets equal to the number of optical inputs;

the sets have parallel optical axes.

According to other preferred provisions of the invention, that optionally may be combined:

the linking module includes a refractive (lens) or reflective (mirror) focusing element for bringing together all the $P_{TN} \times N_E$ beams into $P_{TN}$ spatial focusing points in a single image focal plane;

the $N_E$ outputs of the input deflection module lie in the object focal plane of the focusing element of the linking module and the inputs of the output deflection module lie in the image focal plane of this linking module;

the linking module includes optical elements for increasing and optical elements for decreasing the angular separations between the $P_{TN}$ angular deflection positions respectively generated by each of the outputs of the input deflection module;

the linking module includes a focusing lens and a deflection mirror, the image focal plane $F_{IM}$ of which is coincident with the image focal plane of this focusing lens;

the device has a folded configuration in which identical matrices of elements for the input and output deflection modules are used, one half of the elements of the matrices being involved in the case of the input deflection module and the other half, symmetrical with respect to the center of the various matrices, being involved in the case of the output deflection module.

According to yet other preferred provisions of the invention, that optionally may be combined:

the modules include optical elements arranged in linear arrays or in matrices;

the modules include optical elements of the microlens or micromirror type that can be produced by the collective fabrication processes involved in microtechnologies;

the input or output deflection elements include linear arrays or matrices of mirror elements that can be individually electrically addressed and that lie in parallel planes optionally inclined, on average, with respect to the general optical axis.

According to yet other preferred provisions of the invention, that optionally may be combined:

the linking module has a folded configuration and includes optical angular-tilting elements for bringing together the various potentially deflected beams from the outputs of the input deflection module in a plane perpendicular to the general optical axis and then carrying out the reverse operation on the various beams so as to direct them onto each of the inputs of the output deflection module;

the linking module includes at least one refractive-type focusing element for working in a configuration perpendicular to the general optical axis;

the tilting means comprise linear arrays or matrices of lenses or of mirrors, the focal length of the various elements forming the tilting means being calculated so that each of the optical conjugations involved has the same magnification;

the angular tilting elements constitute elements for increasing and elements for decreasing the angular separations between the potential deflected beams involved.

According to yet other preferred provisions of the invention, that may optionally be combined:

the device comprises, in front of the input deflection module, a splitter component for splitting the luminous power of each of the incoming channels into K equal or unequal parts and for making available a matrix of $K \times N_E$ light beams, each able to be directed toward any one of the outgoing channels, the number $N_S$ of which is at least equal to $K \times N_E$;

the splitter component is produced in integrated optics;

the splitter components are produced in free-space optics and comprise:

a first linear array of $N_E$ collimation means (lenses or mirrors) that makes it possible to collimate the $N_E$ light beams emanating from each of the incoming optical channels along the direction of the axis of the linear array;

a second linear array of $N_E$ reflective or refractive collimation means for collimating the $N_E$ rows of light formed; and a matrix of $K \times N_E$ optical, refractive or reflective, shaping elements for generating, from the $N_E$ rows of light, $K \times N_E$ light beams having optical characteristics matched to the input deflection module;

the device includes, in front of the input deflection module, a demultiplexer component for splitting the L optical variables that can be used as transported data medium, the connection of this component with each of the optical channels of a linear array of $N_E$ incoming optical fibers making it possible to generate $L \times N_E$ light beams that are applied to the input deflection module, the number $N_S$ being at least equal to $L \times N_E$;

the demultiplexer component is produced in integrated optics;

the component is designed to split the light wavelength $\lambda$ and is produced in integrated optics;

the component is designed to split the light wavelength $\lambda$ and is produced in free-space optics and comprises:

a first linear array of $N_E$ collimation means (lenses or mirrors) for collimating the $N_E$ light beams emanating from each of the incoming optical channels with the matched angular aperture;

a linear array of diffraction gratings composed of lines oriented parallel to the axis of the linear array of incoming channels and making it possible for the various wavelengths $\lambda_1, \lambda_2, \ldots \lambda_L$ transported by each of the $N_E$ incoming optical channels to be split spatially, the linear array of gratings being inclined with respect to planes perpendicular to the optical axis of the system at an angle that depends on the angular aperture of the incident light beams and on the separation of the wavelengths of the adjacent beams diffracted by the grating;

a linear array of optical means for redirecting, along directions each parallel to the L light beams of wavelength $\lambda_1, \lambda_2, \ldots \lambda_L$ attached to each of the $N_E$ incoming optical channels and generated by the diffraction grating; and a matrix of optical, refractive or reflective, shaping means arranged in $N_E$ columns and L rows and making it possible to optionally match the optical characteristics of the $L \times N_E$ light beams obtained to the input deflection module.

According to yet other preferred provisions of the invention, that may optionally be combined:

the device comprises, in front of the input deflection module and behind the output deflection module respectively, a demultiplexing component for optical variables as input and a multiplexing component for the same variables as output;

the optical variable in question is the wavelength $\lambda$ and the demultiplexers and the multiplexers used are produced in integrated optics;

the optical variable in question is the wavelength $\lambda$ and the demultiplexers and the multiplexers used are produced in free-space optics.

According to yet other preferred provisions of the invention, that may optionally be combined:

the device is designed for the demultiplexing/multiplexing of optical variables, characterized by the presence of a component for demultiplexing these variables that is placed in front of the input deflection module and of a component for multiplexing these variables that is placed behind the output deflection module, and characterized in that:

the demultiplexer makes it possible to spatially split L optical variables $v_1, v_2 \ldots v_L$ transported by each of the $N_E$ input channels and of generating $L \times N_E$ parallel light beams having matched optical characteristics and arranged in matrices of $N_E$ columns and L rows, each row being attached to the same optical variable $v_1$;

makes it possible to redirect, within each of the L rows, each of the $N_E$ light beams attached to the same optical variable $v_1$ and to generate, as output from the output deflection module, L rows of at least $N_S$ ($=L \times N_E$) potential beams; and the multiplexer brings together these L rows into a single row and reinjects, into any of the outgoing channels arranged in linear arrays, and the number $N_S$ of which is at least equal to $L \times N_E$, any number of channels attached to the various optical variables $v_1$ that lies between 1 and L;

the optical variable in question is the wavelength $\lambda$ and the demultiplexers and the multiplexers used are produced in integrated optics;

the optical variable in question is the wavelength $\lambda$ and the demultiplexers and the multiplexers used are produced in free-space optics.

According to yet other preferred provisions of the invention, that may optionally be combined:

operating control elements are placed on the output side of at least part of the input deflection module or of the output module, these control elements comprising spatial splitting elements for taking off a part of the beams;

the beams involved during the various "object-image" optical conjugation operations have waists whose positions are located at the elements of the various deflection elements;

the collimation lenses give the beams a waist and in that a module for shaping the beams from a linear array or from a matrix of transport microlenses is provided that allows the position of the waists to be shifted;

the incoming and outgoing channels are fibers; and the device includes an additional conjugation element or set of conjugation elements that is placed between the input deflection module and the linking module and/or between the output deflection module and the linking module.

It should be noted that the additional conjugation element or set of conjugation elements makes it possible to adjust the value of the angular separations between the deflected beams. Advantageously, each additional conjugation element comprises two lenses placed in a cofocal configuration.

In general, the lenses used in the module of the invention are preferably microlenses produced using generally collective fabrication processes involved in microtechnologies.

The invention makes it possible in particular to come up with answers for the various types of optical data routers or crossconnects encountered in optical telecommunication systems:

point-to-point routers for all the data transported by any incoming optical fiber $OF_{ie}$ (or $OF_{ie,je}$ in the case of linear arrays) to any outgoing fiber $OF_{is}$ (or $OF_{is,js}$ in the case of linear arrays).

Since several data modes are in general transported by the same fiber and by various optical wavelengths in DWDM (Dense Wavelength Division Multiplexing) systems, it is therefore essential for the routing device to be able to carry out this point-to-point routing operation independently of the wavelengths transported.

Of course, this comment applies if the multiplexing involved uses parameters other than wavelengths (for example light polarization or temporal length of optical datastreams).

This type of router 150 is illustrated schematically in FIG. 3a with sixteen incoming fibers 1 (arranged in linear arrays for the sake of simplicity) each transporting four different wavelengths $\lambda_1$, $\lambda_2$, $\lambda_3$, $\lambda_4$, the data transported by which may be directed by means of the router 150 to any of the sixteen outgoing fibers 5.

The overall architecture of the point-to-point router of the invention is shown in FIG. 2;

power splitter routers, in which the data transported by each incoming fiber $OF_{ie}$ and in general grouped into linear arrays is divided (favorably in an identical manner) into K parts, each part transporting for example a fraction 1/K of the power transported in the fiber $F_{ie}$, it being possible for each part to be directed to a different outgoing fiber indexed $OF_{is,js}$ in the case of a matrix distribution (if the optical power of each incoming fiber is divided into K parts, there will, of course, have to be at least $K \times N_E = N_S$ outgoing fibers.

This type of router is illustrated schematically by FIG. 3b with four incoming fibers 1 each transporting four different wavelengths $\lambda_1$, $\lambda_2$, $\lambda_3$, $\lambda_4$ and the transported data of which, power-divided by four splitters, four channels 60 may be directed by means of the router 150 to any one of the sixteen (4×4) outgoing fibers 5;

wavelength demultiplexer routers, in which each of the modes of any wavelength $\lambda_L$ transported by any incoming fiber $OF_{ie}$, generally grouped into linear arrays, may be directed differently to any outgoing fiber $OF_{is}$, js, generally grouped in matrices. If each incoming fiber transports L modes of different wavelengths, there will therefore be in total $L \times N_E$ different modes and it will therefore be necessary to have at least $N_S = L \times N_E$ outgoing fibers.

This type of router is illustrated in FIG. 3c with four incoming fibers 1 each conveying four different wavelengths $\lambda_1$, $\lambda_2$, $\lambda_3$, $\lambda_4$, the sixteen data modes (four wavelengths for each of the four incoming fibers) of which are separated by the demultiplexer 70 and then directed by the router 150 to any of the sixteen outgoing fibers 5;

wavelength demultiplexer/multiplexer routers, in which L modes with different wavelengths $\lambda_L$, each transported by $N_E$ incoming fibers, are mixed and redirected to an equivalent number $N_S$ of outgoing optical fibers, each also transporting L modes with different wavelengths.

This type of router is illustrated in FIG. 3d with four incoming fibers 1 each conveying four different wavelengths $\lambda_1$, $\lambda_2$, $\lambda_3$, $\lambda_4$, the sixteen data modes (four wavelengths for each of the four incoming fibers) of which are separated by the demultiplexer 70, redirected by the router 150 then remultiplexed by the multiplexer 80 to the four outgoing fibers 5, therefore each receiving four modes of wavelengths $\lambda_1$, $\lambda_2$, $\lambda_3$, $\lambda_4$ coming from any one of the incoming fibers.

More generally, the device of the invention can perform all of the routing operations encountered in DWDM-type optical telecommunication systems and, in particular, can drop or add one or more of the wavelengths transported by any one or more optical fibers of a network node in order to redistribute them in one or more optical fibers of the same network node (generalized "add and drop" function).

As indicated above, this type of functionality may be applied to optical parameters other than the wavelength, in particular the polarization and duration of light pulses.

In the case of point-to-point routers (i.e. without multiplexing of optical variables), the general principle involved in the invention may be described by the succession of the following subsystems illustrated in FIG. 2:

an input subsystem 40 for shaping the optical beams coming from the $N_E$ incoming optical fibers 1, in particular in terms of numerical aperture $\Delta \phi_E$ so as to match this numerical aperture to the deflection system described below (condition for angular separation of the various deflected beams, inter alia). This input subsystem therefore generates $N_E$ optical beams 112, of matched aperture, all parallel to the optical axis of the device. This subsystem 40 will be denoted by $SM^E$ (standing for Entry or input Shaping Module);

a first optical beam deflection subsystem 30 for generating, from each of the $N_E$ optical beams shaped by the input subsystem 40, $N_S$ angular deflection positions. This subsystem involves the APAM (Angular Position Amplification Module) described in the previous invention (patent application filed on the same day) which uses at least one cascade of optical beam deflection means $DM^{1E}$, $DM^{2E}$, ... $DM^{iE}$, ... $DM^{NE}$. This subsystem will be denoted by $APAM^E$ (E standing for Entry or input);

a linking module LM 50 that makes it possible to connect, on a one-to-one basis, each of the $N_S$ angular deflection positions given by each of the $N_E$ elements of the last deflection means $DM_{NE}$ of the subsystem 30 to the $N_S$ elements of the first deflection means $DM^{iS}$ of the second optical beam deflection subsystem 35;

a second deflection subsystem 35 for redirecting the various optical beams actually deflected by the first deflection subsystem and thus for forming $N_S$ optical beams 212 once again parallel to the optical axis of the system. This second deflection subsystem involves a second APAM favorably identical to the first and denoted by $APAM^S$ (S standing for output). This second module $APAM^S$ uses at least one cascade of optical beam deflection means $DM^{1S}$, $DM^{2S}$, ... $DM^{iS}$, ... $DM^{NS}$;

an output subsystem 45 for shaping the $N_S$ optical output beams 212, made parallel by the second deflection subsystem, the function of which is to reinject these $N_S$ optical output beams 212 into the $N_S$ optical outgoing fibers 5 with maximum efficiency. This subsystem will be denoted by $SM^S$.

In the case of power splitter routers, demultiplexer/multiplexer routers and demultiplexer routers, it is necessary to insert, into the preceding chain, the input power division 60 or demultiplexing 70 subsystems and the output multiplexing subsystem 80, respectively. Depending on the types of subsystem chosen above, these may be inserted before or after the input or output subsystems for shaping the optical beams.

4. DETAILED DESCRIPTION OF THE INVENTION

Subjects, features and advantages of the invention will become apparent from the following description, given by way of non-limiting illustration in conjunction with the appended drawings, in which.

Figure 8:
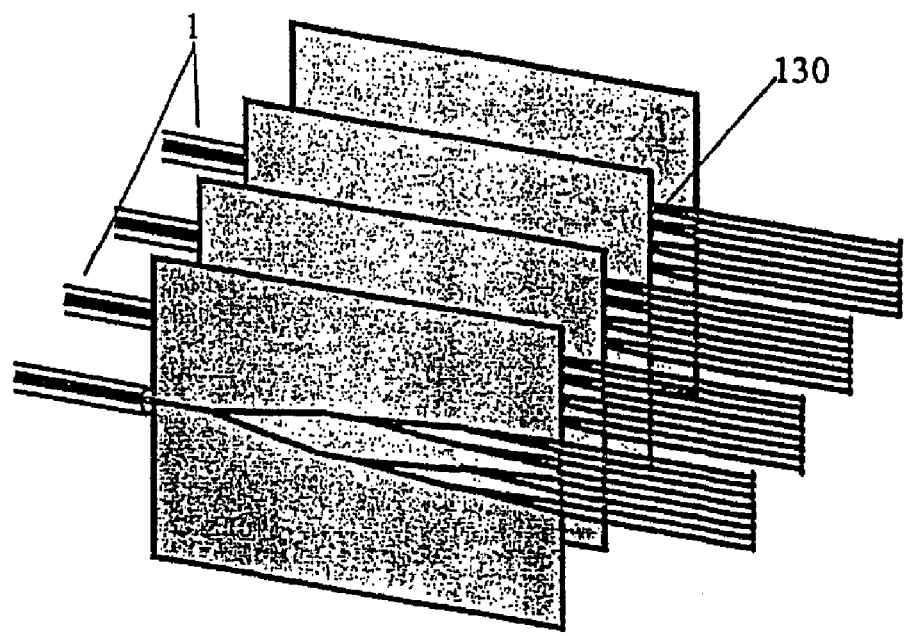
Figure 9:
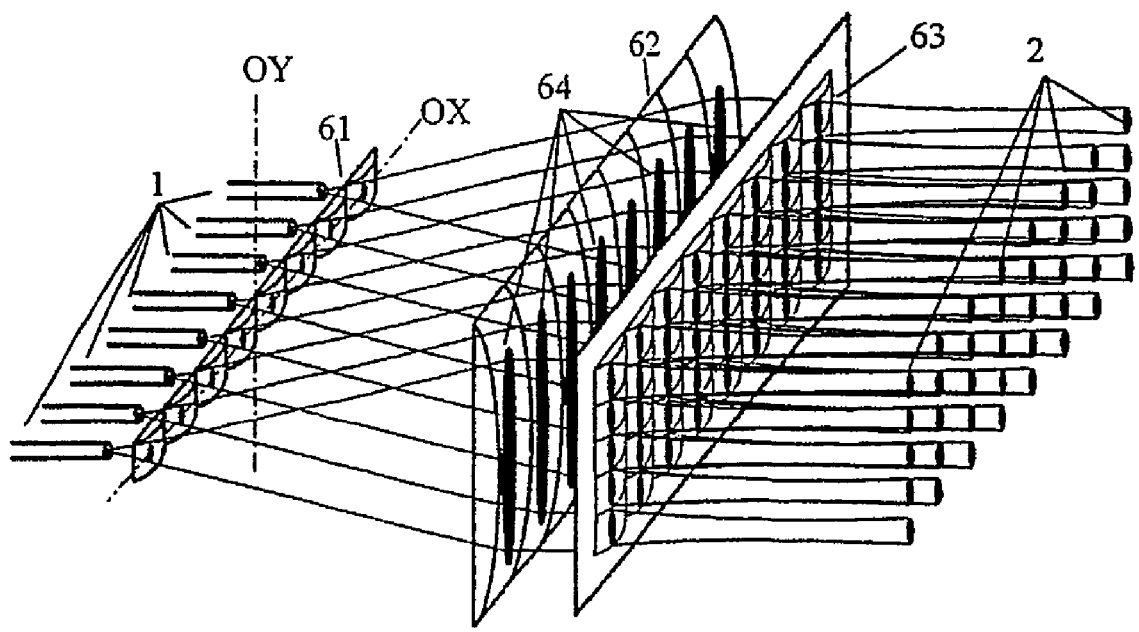
Figure 10:
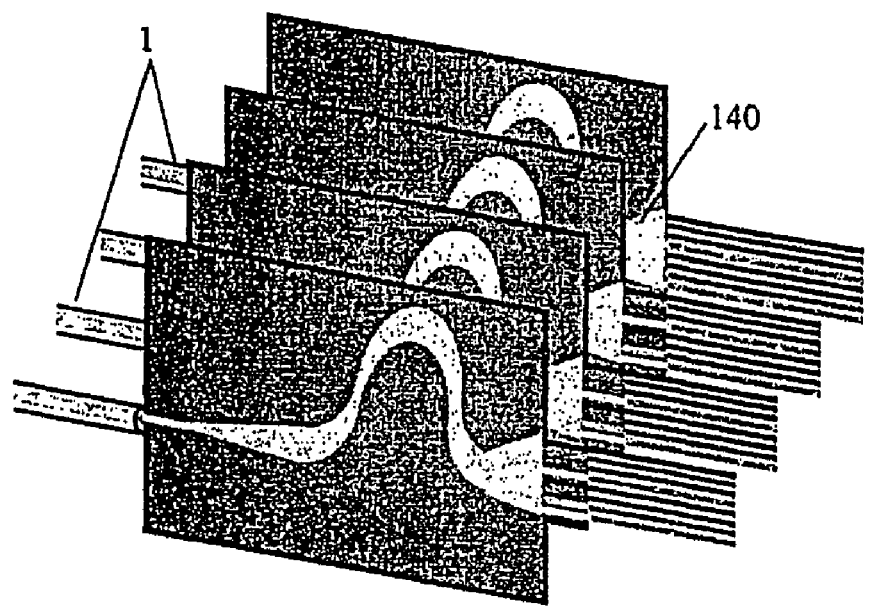
Figure 11:
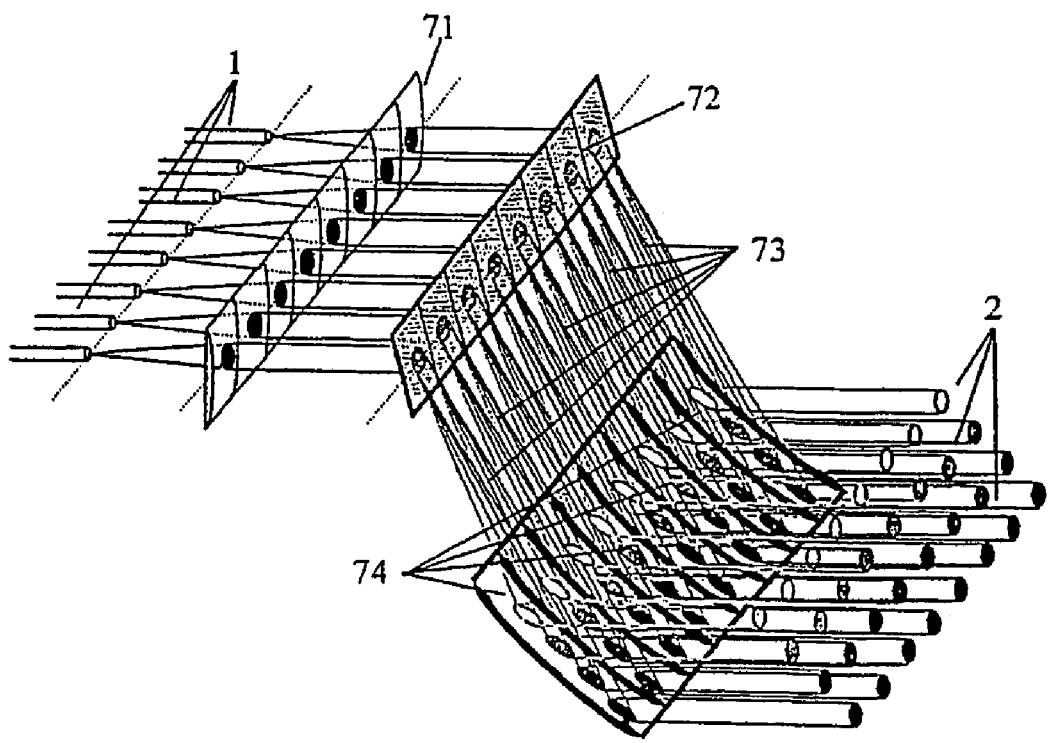
Figure 12:
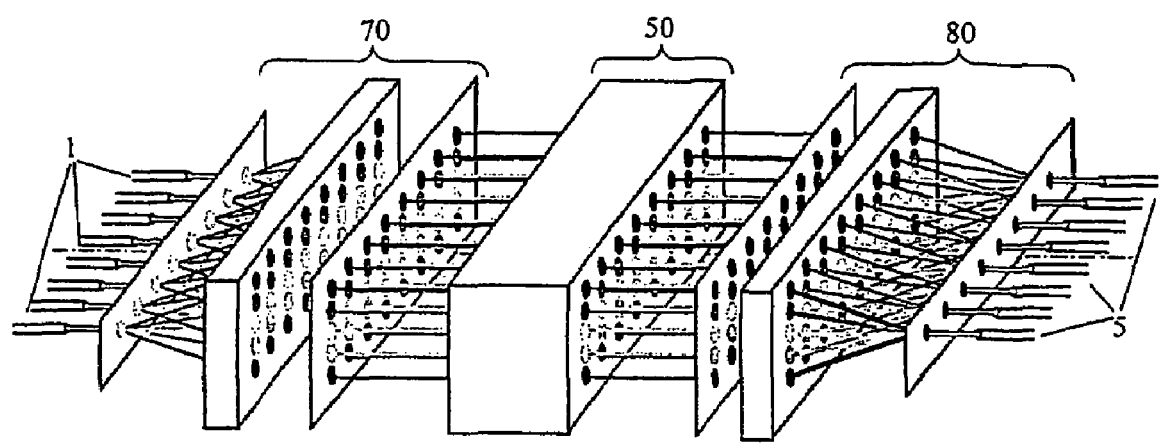
Figure 13A:
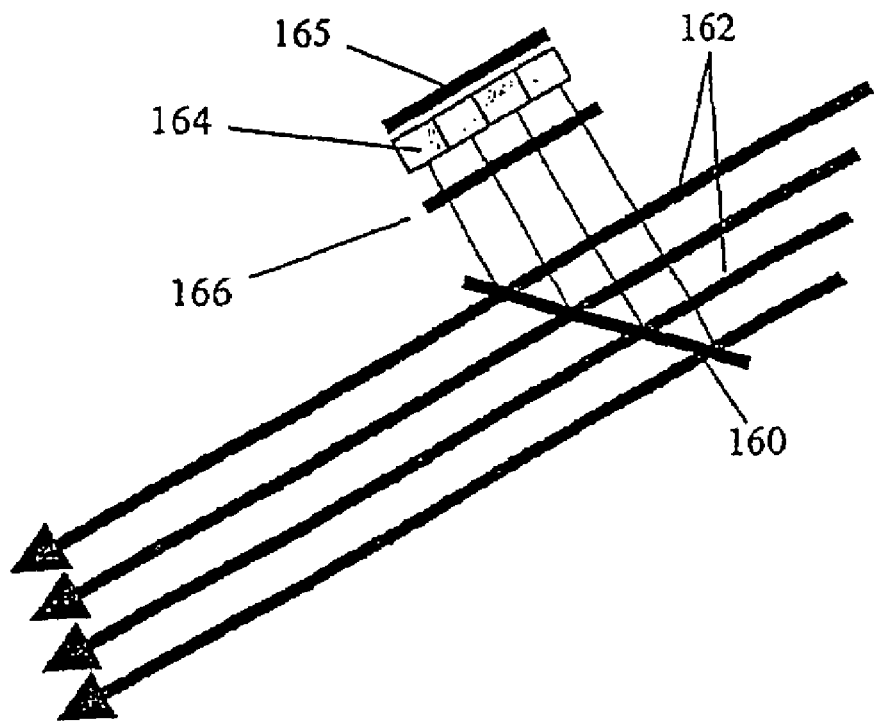
Figure 13B:
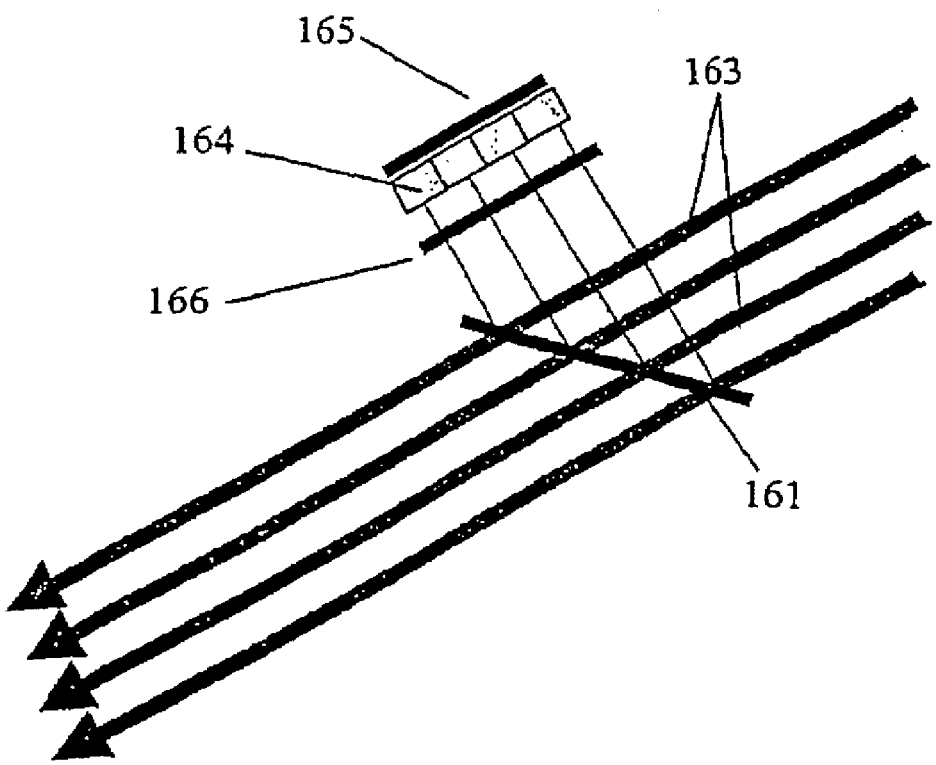
Figure 14A:
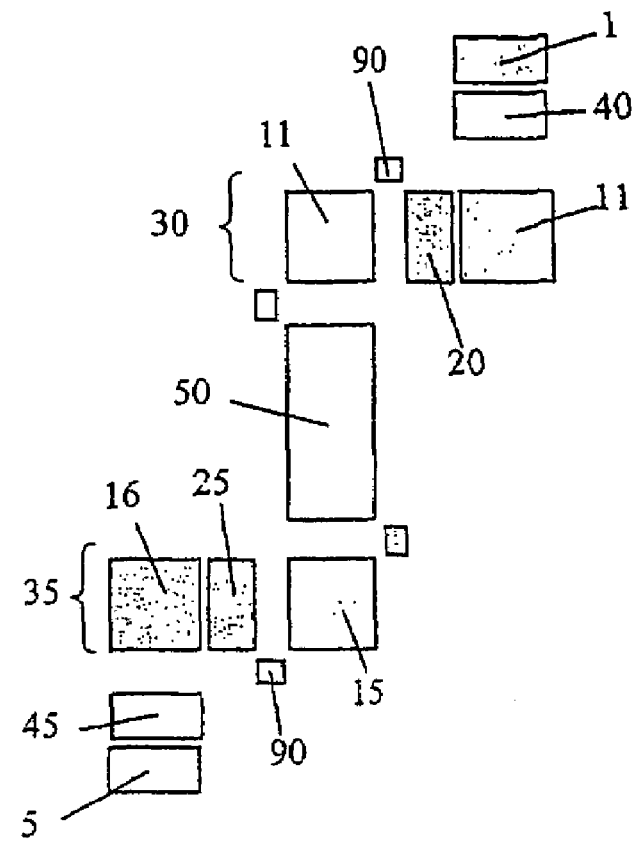
Figure 14B:
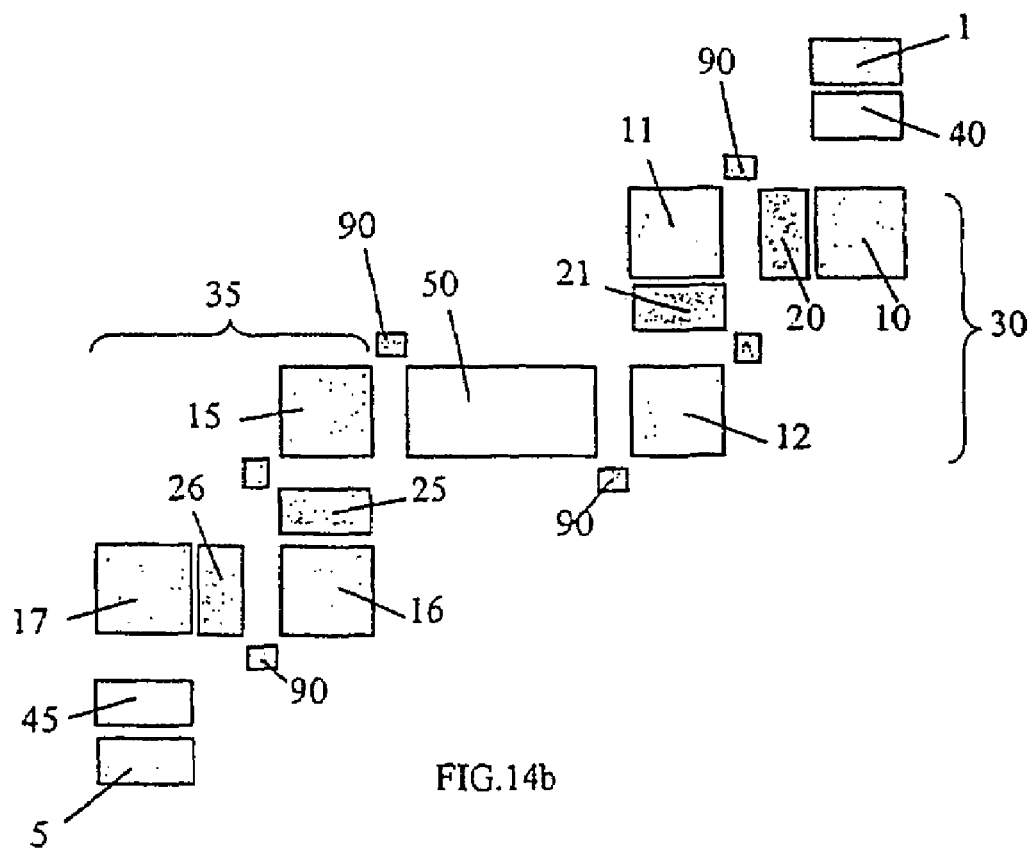
Figure 15:
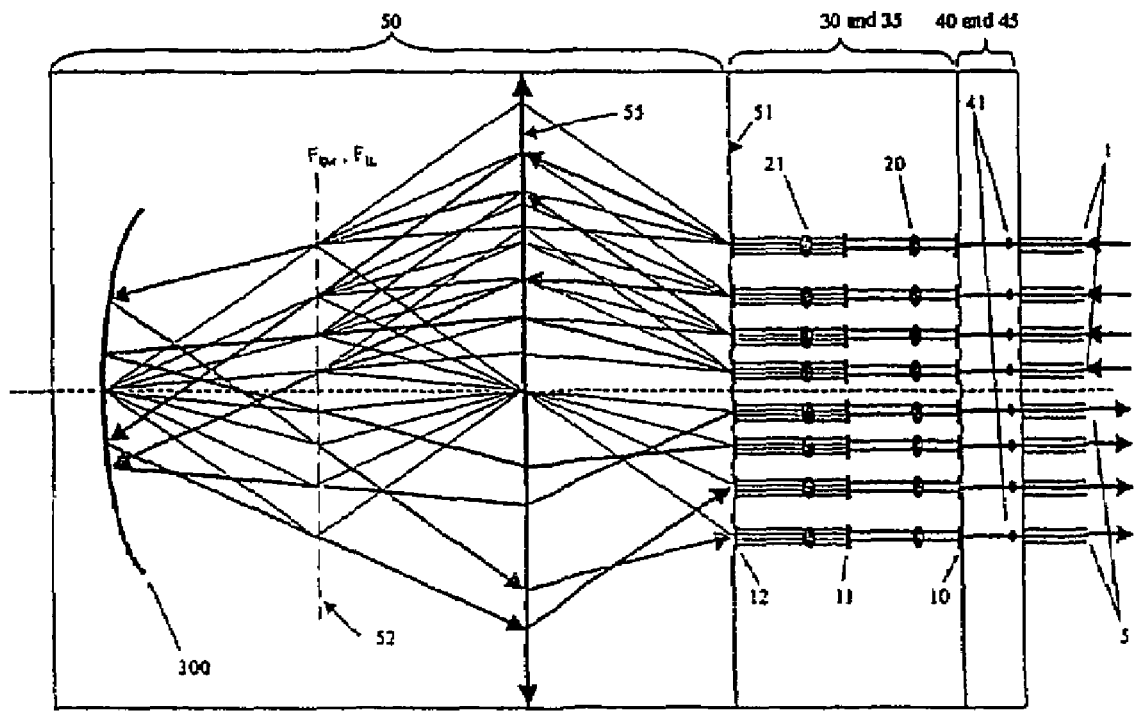
Figure 16:
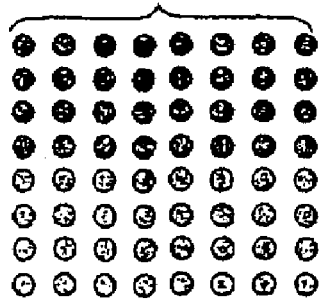

FIG. 8 gives an example of one possible embodiment of part of a power splitter router using an integrated optical component as splitter;

FIG. 9 gives an example of one possible embodiment of a power splitter using a free-space optical component as splitter;

FIG. 10 gives an example of one possible embodiment of a wavelength demultiplexer or demultiplexer/multiplexer using an AWG-integrated optical component;

FIG. 11 gives an example of one possible embodiment of the demultiplexer or multiplexer element using a free-space optical component;

FIG. 12 gives a schematic representation of a demultiplexer/multiplexer router according to the invention;

FIGS. 13a and 13b give a schematic representation of control means that can be used in the invention;

FIGS. 14a, 14b, 14c, 14d give examples of a possible embodiment of point-to-point routers according to the invention, the complexity of which (number of incoming and outgoing fibers) increases. These various examples therefore involve an increasing number of input and output deflection means, namely two (FIG. 14a), three (FIG. 14b), four (FIG. 14c) and five (FIG. 14d);

FIG. 15 is a schematic view of a router according to the invention in which the matrices or linear arrays comprise both an input deflection module part and an output deflection module part;

FIG. 16 is a view of such a matrix; and

Figure 17:
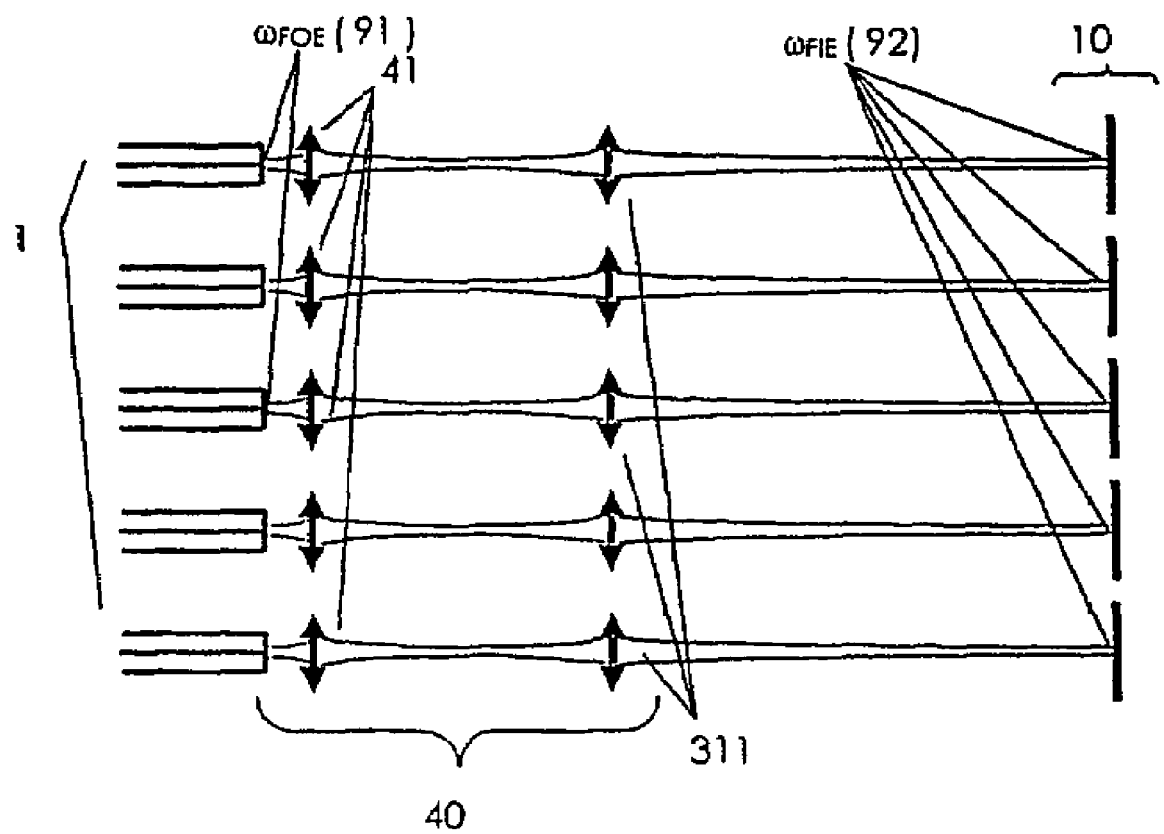

FIG. 17 is a diagram showing the shaping of the input optical beams making it possible both to optimize their optical characteristics (divergence and amount of waist) and the geometrical dimensions of the input and output shaping modules.

4.1 Point-to-point Optical Router

Figure 2:
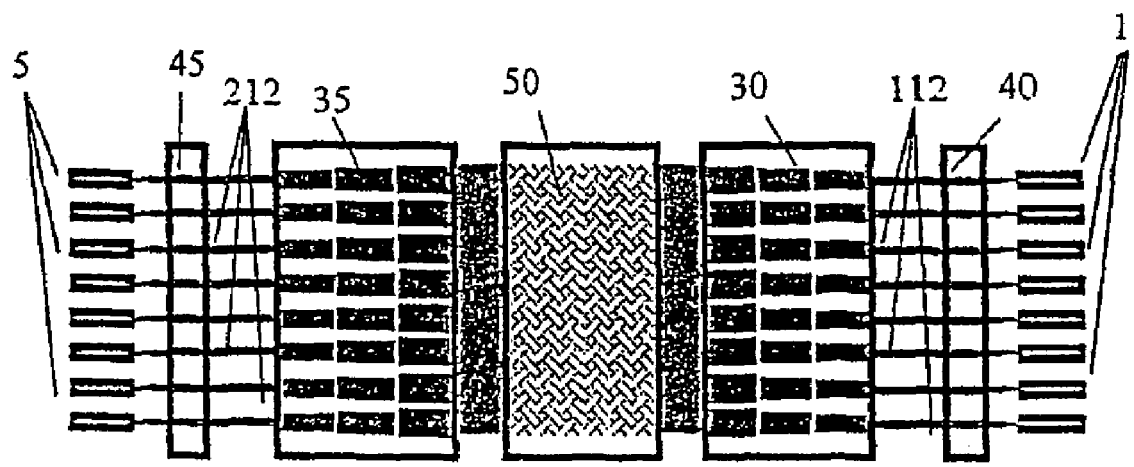
FIG. 2 shows a schematic representation of the optical router of the invention.
Figure 3A:
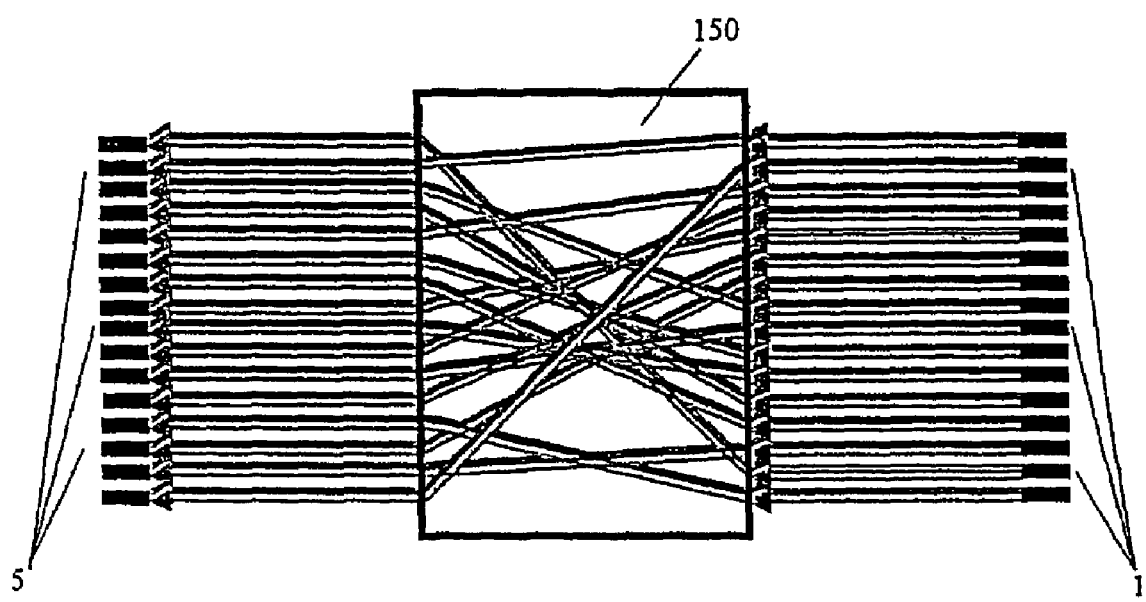
FIGS. 3a to 3d show a schematic representation of the various optical routers that can be produced with the architecture of the invention.

This is the basic device of the invention, the functionality of which is shown schematically in FIG. 3a. It is composed of the various subsystems mentioned in section 3 and illustrated in FIG. 2, these now being described in greater detail.

Input Optical Beam Shaping Subsystem

The emitted light beam output by an optical fiber may be likened to a Gaussian beam whose intensity distribution follows approximately a law of the form:

$$I(x,y,z)=\exp[-2(x^2+y^2)/\omega(z)^2]$$

where $\omega(z)$ therefore represents the half-width at $1/e^2$ of this intensity distribution along two orthogonal axes Ox and Oy lying in a plane of coordinates z perpendicular to the light beams. Gaussian beams are useful as they have the property of remaining Gaussian during a succession of optical conjugation operations. In such beams, $\omega(z)$ passes through a minimum value or waist, which determines the propagation characteristics and in particular the divergence of said beam. If $\omega_i$ is the value of the radius of the waist of a Gaussian beam $F_i$, its total angle divergence $\delta\Phi_i$ will be:

$$\delta\Phi_i=2\lambda/\pi\times\omega_i, \text{ where } \pi=3.1416$$

Upon optical conjugation by a lens or mirror (or a system of lenses and/or mirrors) of focal length $f_i$, the waist $\omega_i$ becomes $\omega_{i+1}$, where:

$$\omega_{i+1}=\lambda\times f_i/\pi\times\omega_i.$$

Figure 4A:
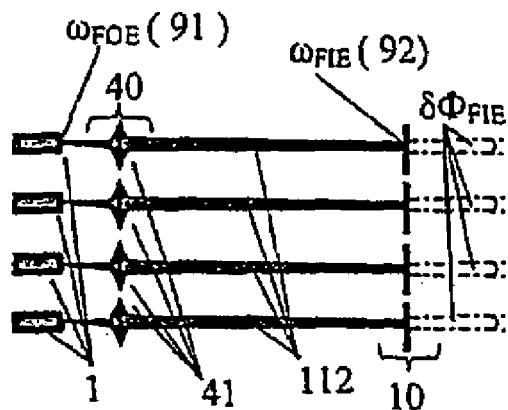
FIGS. 4a and 4b illustrate the possible configurations of the beam shaping subsystem for two angles of inclination ($\phi=0$ and $\phi\neq0$)
Figure 4B:
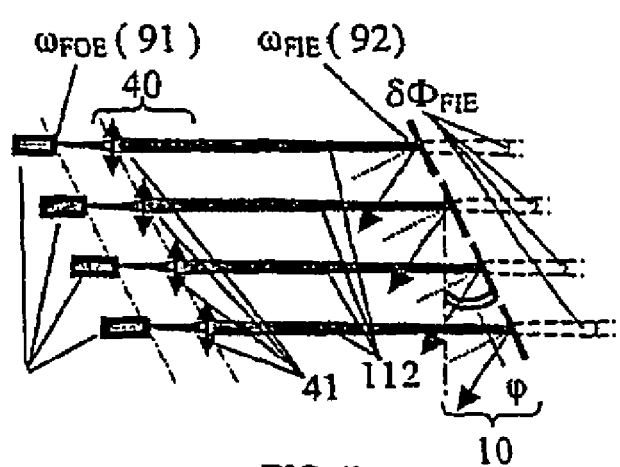

The input shaping system 40 is shown schematically in FIG. 4a in an in-line configuration in which the angle of inclination $\phi$ of the components to the optical axis is equal to 0 and in FIG. 4b in the general case of mirror systems for which $\phi$ is different from 0 and in which, in order to maintain perfect symmetry between the various optical beams involved, each subsystem must overall be inclined by the same angle $\phi$.

Figure 5:
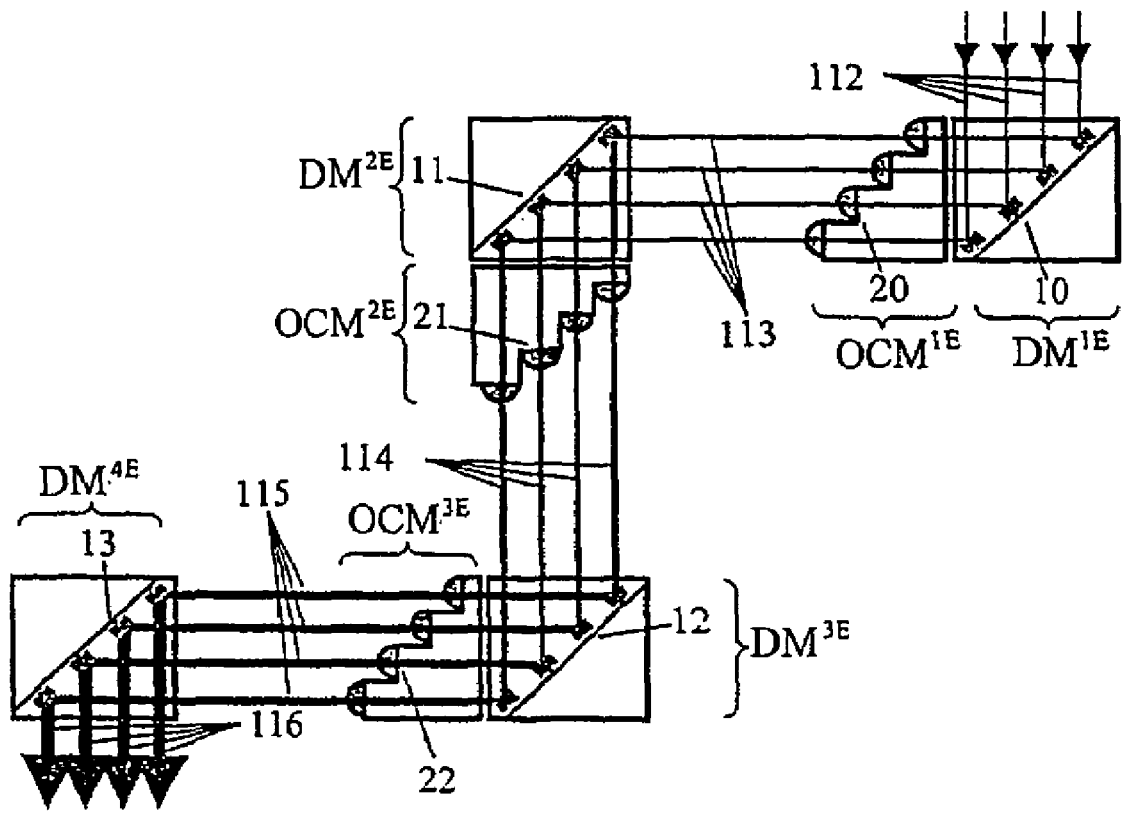
FIG. 5 shows an example of one possible embodiment of the input deflection subsystem.

This shaping system must be used to collimate the various optical beams 112 emanating from the incoming fibers and incident on the various elements of the first deflection means $DM^{iE}$ of the angular position amplification module APAM (the case shown in FIG. 5). It must also ensure parallelism of all these beams 112 and determine their angular apertures so that, after deflection by the various elements of the first deflection means, each deflected beam is angularly separated from its neighbors. If $\delta\theta_1$ is the angular deflection between two adjacent beams deflected by the first elements of the cascade of micromirrors and $\delta\Phi_{FIE}$ is the angular aperture of these input beams, this condition is given by:

$$\delta\Phi_{FIE}<\delta\theta_1.$$

It is this condition that is used to determine the focal length $f_{MFE}$ of the elements of the input shaping subsystem, since:

$$\delta\Phi_{FIE}=2\lambda/\pi\times\omega_{FIE}$$

and $$\omega_{FIE}=\lambda\times f_{MFE}/\pi\times\omega_{FOE}$$

where $\omega_{FOE}$ represents the value of the waist 91 of the beams emitted by the incoming optical fibers 1 and $\omega_{FIE}$ represents the value of the waist 92 of the optical beams collimated by the input shaping means 40. By combining the previous equations, the following is obtained:

$$f_{MFE}>2\omega_{FOE}/\delta\theta_1.$$

Numerical application: $\omega_{FOE}=4$ μm and $\delta\theta_1=1°$ result in $f_{MFE}>460$ μm; or: $\omega_{FOE}=4$ μm and $\delta\theta_1=4°$ result in $f_{MFE}>115$ μm.

In practice, $f_{MFE}$ will be chosen to be larger (for example 1 mm in the example given) in order to have deflected optical beams that are angularly well separated.

If the number of incoming optical fibers is $N_E$, the input subsystem must therefore have $N_E$ optical shaping elements 41.

These elements, that favorably will be microlenses or combinations of microlenses (the case illustrated in FIGS. 4a and 4b) or micromirrors or combinations of micromirrors of focal length $f_{MFE}$, will give $N_E$ parallel beams 112 of aperture $\delta\Phi_{FIE}$ incident on $N_E$ deflection elements of the first deflection means $DM^{1E}$ (10) of the cascade, respectively. Of course, the configuration of these various groups of $N_E$ elements will be identical (single element or linear arrays or matrices of elements of identical spacing grouping together the homologous elements within the various lines of the module in question).

It is therefore possible to index each element making up the input module in the most general case (matrix of $N'_E \times N''_E = N_E$ fibers) by two indices ie and je, ie being the row index (varying from 1 to $N'_E$) and je the column index (varying from 1 to $N''_E$) of the various matrices of elements.

Each incoming optical fiber 1 will therefore be indexed $OF^E_{ie,je}$.

Each element of the means 40 for shaping the input optical beams will therefore be indexed $SM^E_{ie,je}$.

Each optical beam 112 incident on the elements of the first input deflection means $DM^{1E}$ will be indexed $IB_{ie,je}$.

Each deflection element of the first input deflection means $DM^{1E}$ (10) of the cascade will be indexed $DE^{1E}_{ie,je}$ and so on, namely $DE^{2E}_{ie,je}$ for the second deflection means $DM^{2E}$ (11), ... $DE^{NE}_{ie,je}$ for the means $DM^{NE}$. There is therefore a one-to-one correspondence between each of the incoming fibers and each of the elements of the subsystems. Obviously for the sake of simplicity it is natural to choose subsystems of identical geometrical dimensions (spacing of the elements of the various linear arrays along the common axis or of the elements of the various matrices along the two common axes for all the subsystems).

Input Subsystem for Deflecting the Input Optical Beams and for Increasing the Number of Angular Positions Potentially Adopted Thereby:

This subsystem 30, illustrated for example by the diagram in FIG. 5, uses a first input APAM module $APAM^E$ described in detail in the patent application filed on the same day, comprising a cascade of N input deflection means $DM^{1E}$ (10), $DM^{2E}$ (11), ... $DM^{iE}$ ... $DM^{NE}$ such that:

two consecutive means $DM^{i+iE}$ and $DM^{iE}$ of the cascade are optically conjugate in pairs with magnification $G_{i+1,i}$ by optical conjugation means $OCM^{iE}$;

the total number of angular deflection positions $P_{TN}$ potentially generated by each element $DE^{NE}_{ie,je}$ of the last deflection means $DM^{NE}$ is at least equal to the number $N_S$ of outgoing fibers and is configured in a geometrical configuration homothetic with that of the outgoing fibers (linear distribution of deflection points if the outgoing fibers are distributed in a linear array or matrix of deflection points if the outgoing fibers are distributed in a matrix).

"Potentially" means that each element $DE^{NE}_{ie,je}$ of the last deflection module $DM^{NE}$ of the cascade of the deflection means is calculated in order to provide $P_{TN}$ different angular deflection positions but that, among these $P_{TN}$ positions, only one (different for each of the elements) will actually be adopted by the light beam associated with each element $DE^{NE}_{ie,je}$.

It may also be stated that there is a row having a cascade of individual means for each input of the module, the individual means, that are homologous within these rows, being grouped together within the aforementioned means.

At the output of the input deflection subsystem, there therefore exists only a single light beam actually deflected by the element $DE^{NE}_{ie,je}$, and therefore in total $N_E$ deflected beams each having a separate angular deflection position from among the $P_{TN}$ potential deflection positions that each of the elements $DE^{NE}_{ie,je}$ can provide. The number $P_{TN}$ may be greater than $N_E$ either because the deflection subsystem makes it possible to generate only certain particular values (for example multiples of 2 or of 4, as will be the case in general with the APAM modules described in the previous invention) or because the number of outgoing fibers $N_S$ is greater than the number of incoming fibers $N_E$ so as to ensure better flexibility of the routing system (redundancy or standby with further rows). This comment also applies to the input, in which some of the $N_E$ incoming fibers may be on standby and therefore may temporarily not carry data in order, for example, to ensure redundancy in the event of certain channels breaking down.

In order for the number of deflected beams output by each deflection element of two consecutive deflection means $DM^{i,E}$ and $DM^{i+i,E}$ to all be separate and angularly equidistant, the magnification $G_{i+,1}$ produced by the optical conjugation means is given by the general formula:

$$G_{i,i+1} = P_i \times (P_{i+1}-1)/(P_i-1)$$

in which $P_i$ and $P_{i+1}$ represent the number of angular positions that can be adopted by the deflection elements of the deflection means $DM^{iE}$ and $DM^{i+i,E}$. In particular (patent application filed on the same day), if the various deflection means involved are identical, $P_i = P_{i+1} = P$ for all values of i, then:

$$G_{i,i+1} = P.$$

The total number $P_{TN}$ of equidistant angular deflection positions as output of each of the elements is:

$$P_{TN} = P_1 \times P_2 \times P_3 \times \ldots P_i \times \ldots P_N$$

or, if $P_1 = P_2 = \ldots P_i \ldots = P_N$:

$$P_{TN} = P^N.$$

FIG. 5 shows one possible representation of the deflection subsystem of the invention in the case of an APAM module having a cascade of N=4 deflection modules 10, 11, 12, 13 arranged in linear arrays, each of four deflection elements. The optical conjugation means 20, 21, 22 therefore also comprise at least N−1=3 elements and are arranged in an object-image configuration of magnification $G_{i,i+1} = 2$, which means that, in the example shown in FIG. 5, the micromirror-type deflection elements may each have P=2 angular positions about at least one axis having a common direction for all the elements. In the particular case of FIG. 5, in which the number of deflection means is equal to 4 and $P_1 = P_2 = P_3 = P_4 = P = 2$, each of the elements of each deflection means $DM^{iE}$ is therefore capable of generating two deflected beams for each incident beam. There is therefore, as output by each of the elements of the deflection means $DM^{1E}$ (10), $DM^{2E}$ (11), $DM^{3E}$ (12), $DM^{4E}$ (13) respectively two, four, eight, sixteen potentially deflected light beams lying in the plane of FIG. 5 if it is assumed that the common direction of rotation of the micromirror-type deflection elements is perpendicular to this plane.

The increase in the number of these potential deflected beams 113, 114, 115, etc. over the incident beams 112 on the first elements of the deflection means $DM^{1E}$ (10) is shown symbolically by an increasing width of the lines representing these various deflected beams output by each stage of the cascade.

In the most general case of a matrix distribution, each element $DE^{NE}_{ie,je}$ of the last deflection means $DM^{NE}$ will generate a matrix of $P_{TN}$ angular deflection positions of at least $N'_S$ rows and $N''_S$ columns if the distribution of the outgoing fibers is a matrix of $N'_S \times N''_S$ fibers.

To simplify matters and without this detracting from the generality of the invention, it will be assumed that the number of deflection positions generated by each element $DE^{NE}_{ie,je}$ of the last deflection means $DM^{NE}$ is equal to $N'_S \times N''_S$.

It should be noted here that, in a point-to-point router, the number $N_S$ of optical outgoing fibers may be greater than or equal to the number $N_E$ of incoming fibers for the above-mentioned redundancy or anticipation requirements, but, since an incoming fiber in this type of router can be connected only to a single outgoing fiber, there cannot be more than $N_E$ fibers among the $N_S$ outgoing fibers actually transporting data.

The $N'_S \times N''_S$ values of the matrix of angular deflection positions generated by each element $DE^{NE}_{ie,je}$ output by the first module $APAM^E$ may be indexed $\theta^E_{is,js,ie,je}$, is denoting the row index and js denoting the column index of this angular deflection matrix and ie and je denoting the indices of the element $DE^{NE}_{ie,je}$ from which the beams of the angular position matrix emanate.

There are therefore in total $N'_S \times N''_S \times N'_E \times N''_E$ potential angular deflection positions output from the first module $APAM^E$. These deflection positions are potential since, in a given configuration of the cascade of the deflection means, each element (among the $N'_E \times N''_E$) of the $APAM^E$ input module generates only one angular position amongst the $N'_S \times N''_S$ that are possible. This position is different for each of the deflection elements since, in a point-to-point router, an incoming fiber in a given configuration is connected to one and only one outgoing fiber.

If $N'_E \times N''_E = N'_S \times N''_S$ (the most conventional case), that is to say if the number of incoming fibers is equal to the number of outgoing fibers, the set of potential angular deflection positions is actually occupied by one of the $N'_E \times N''_E$ incident beams $IB_{ie,je}$ output by the first $APAM^E$ module and each of the $N'_E \times N''_E$ elements $DE^{NE}_{ie,je}$ of the last deflection means $DM^{NE}$ of this module deflects the incident optical beam $IB_{ie,je}$ that corresponds to it according to one and only one of the $N'_S \times N''_S$ ($=N'_E \times N''_E$) potential angular positions $\theta^E_{is,js,ie,je}$.

If $N'_S \times N''_S$ is greater than $N'_E \times N''_E$, certain angular positions (their number will be equal to the difference $N'_S \times N''_S - N'_E \times N''_E$) are not actually occupied and certain outgoing fibers will not be connected to an incoming fiber in a given routing configuration (these unconnected fibers may, for example, be emergency fibers or standby fibers in order to anticipate a future increase in the number of incoming optical fibers).

To simplify the presentation, it will be assumed hereinafter that $N'_E \times N''_E = N'_S \times N''_S$.

It will therefore now be necessary to bring into one-to-one correspondence each of the $N'_S \times N''_S$ different angular positions $\theta^E_{is,js,ie,je}$ that are generated by each of the elements $DE^{NE}_{ie,je}$ of the last deflection means $DM^{NE}$ of the first module $APAM^E$ with respect to the various elements $DE^{1E}_{is,js}$ of the first deflection means $DM^{1S}$ of the second deflection subsystem $APAM^S$.

This is the function of the second key subsystem of the invention, namely the linking module LM.

Linking Module

The linking module 50 must achieve the one-to-one correspondence between the $N'_S \times N''_S$ angular deflection positions and the $N'_S \times N''_S$ deflection elements $DE^{1S}_{is,js}$ of the first deflection means $DM^{1S}$ of the output subsystem $APAM^S$.

Figure 6A:
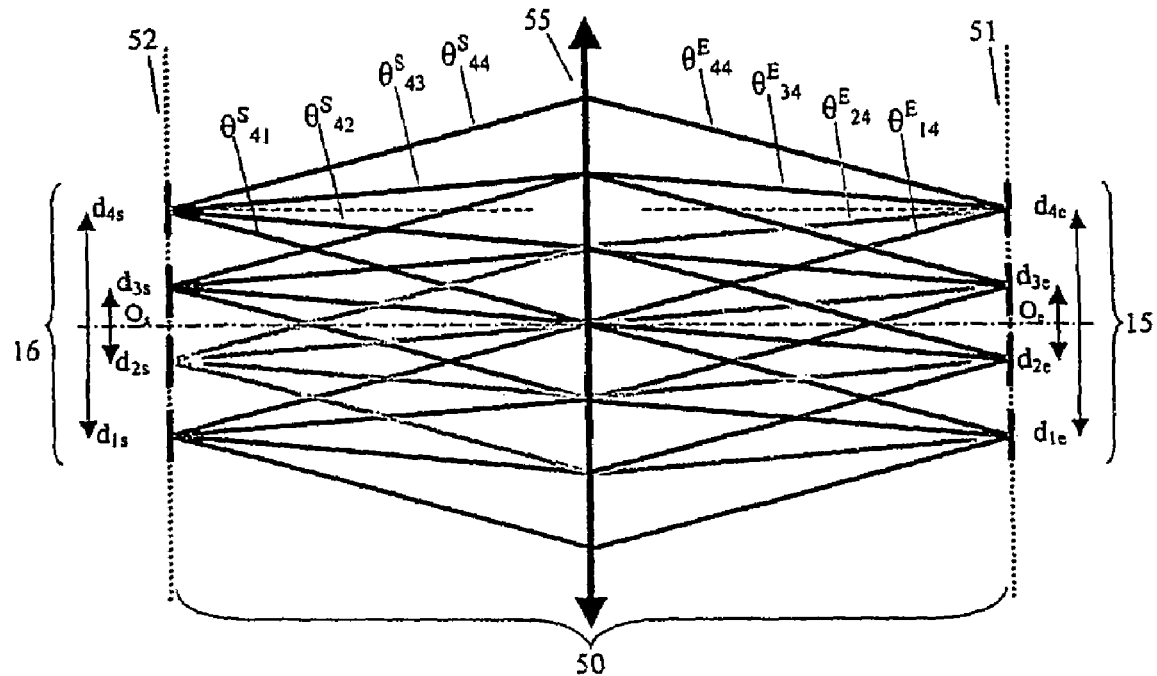
FIGS. 6a, 6b, 6c, 6d, 6e, 6f illustrate the principle of operation of the linking module and various possible configurations for reducing the overall size of this module.
Figure 6B:
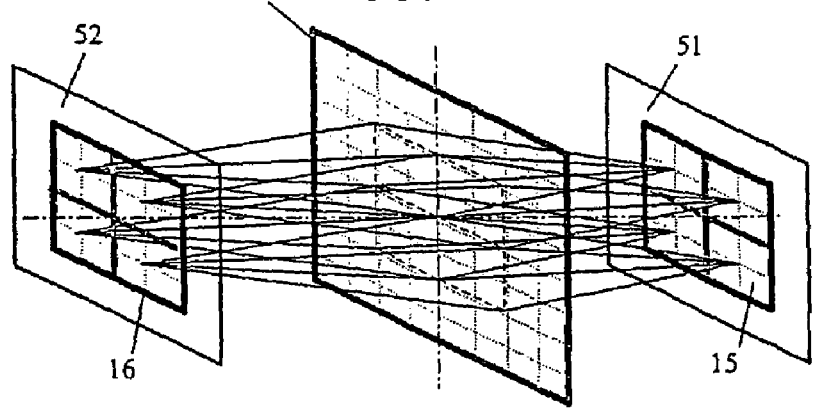

Its operating principle is illustrated in FIG. 6a in a planar representation and in FIG. 6b in a perspective view, allowing better understanding of the operation of the linking module in the matrix configurations (matrix of four elements in FIG. 6b) of the various subsystems.

For reasons of understanding, the linking modules in FIGS. 6a and 6b involve in-line optical deflection means that are perpendicular to the optical axis of the system ($\phi=0$), which assumes the use of nonreflective deflection means. The system of the invention, which favorably uses mirrors as deflection means, implies $\phi \neq 0$. This particular feature usually requires modifications to the architecture of the linking module which will be examined below but which do not in any way modify the basic principle on which the module LM relies and which will now be described.

All the beams potentially emanating from the various elements $DE^{NE}_{ie,je}$ with a deflection angle $\theta^E_{is,js,ie,je}$ whose indices is,js are identical are, by construction, deflected along parallel directions (the cascades of elements $DE^{1E}_{ie,je}$, $DE^{2E}_{ie,je}$ ... $DE^{NE}_{ie,je}$ are all identical and therefore give matrices of deflected beams that are identical). They must be able to converge on the same element $DE^{1S}_{is,js}$ of the first deflection means $DM^{1S}$ of the output subsystem $APAM^S$. This functionality may be achieved by an optical focusing means OFM denoted by 55 in FIG. 6a.

This optical means 55 may consist of one or more lenses or one or more mirrors (for example parabolic mirrors). It focuses the set of potentially deflected optical beams $DB^E_{is,js,ie,je}$ (deflected by the elements of the last deflection means $DM^{NE}$ (15) of the input deflection subsystem $APAM^E$) with an angular deflection $\theta^E_{is,js,ie,je}$ of the same indices is,js toward the same element $DE^{1S}_{is,js}$ of the first deflection means $DM^{1S}$ (16) of the output deflection subsystem $APAM^S$ if the latter lies in its image focal plane 52.

The set of optical beams focused by the optical means 55 and corresponding to the various deflected beams $DB^E_{is,js,ie,je}$ will be denoted by $FDB^S_{is,js,ie,je}$.

The focal length $f_{LM}$ of the optical means of the module LM is calculated in such a way that the point of convergence of the various focused deflected beams $FDB^S_{is,js,ie,je}$ of the same index is,js coincides with the center of the element $DE^{1S}_{is,js}$, as shown schematically in FIGS. 6a and 6b.

In general, the deflection means involved in the two, input and output, deflection subsystems will be identical and will generate identical angular positions; it is therefore necessary that the linking module preserve this symmetry and in particular that the angles $\theta^S_{is,js,ie,je}$ of the focused optical beams $FDB^S_{is,is,ie,je}$ on the elements $DE^{1S}_{is,js}$ of the deflection means $DM^{1S}$ take a range of values identical to that of the angles $\theta^E_{is,js,ie,je}$ of the corresponding beams $DB^E_{is,is,ie,je}$ output by the elements $DE^{NE}_{ie,je}$ of the deflection means $DM^{NE}$.

This condition is achieved if the deflection means $DM^{NE}$ 15 is placed in the object focal plane 51 of the optical focusing means 55, as shown in FIG. 6a.

As mentioned above, several particular adaptations of the linking module LM must or may be used in order to take into account the generally folded configuration of the system, or particular values of the operating parameters such as the value of the angular separation between the various deflection positions given by the subsystem $APAM^E$.

Figure 6C:
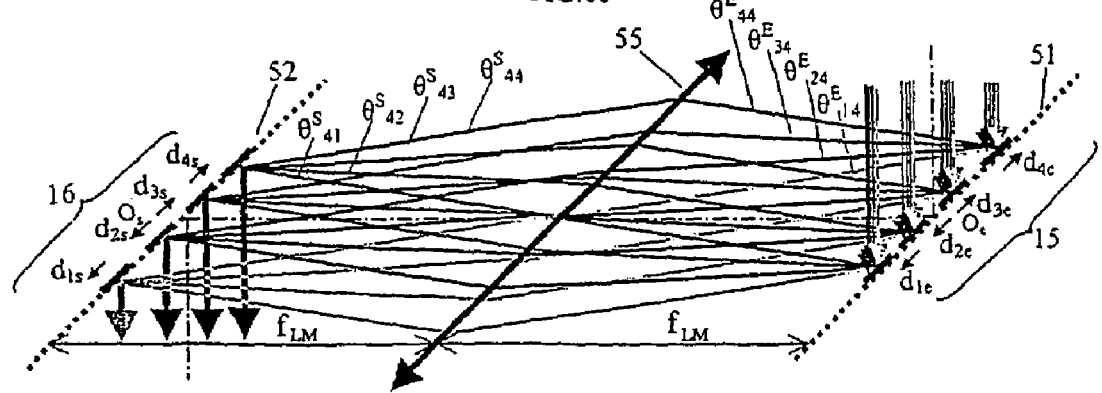

FIG. 6c illustrates the situation of a "folded" system, the various optical means of which are inclined at an angle $\phi \neq 0$ with respect to the optical axis and/or, to preserve the desired symmetry, the optical focusing means OFM is inclined with respect to the optical axis at the same angle $\phi$ (chosen to be 45° in the figure).

In FIGS. 6a and 6c, of planar configuration, the number of elements $DE^{NE}$ and $DE^{1S}$ involved and the number of angular deflection positions $\theta^E$ and $\theta^S$ associated with each of these elements have been chosen to be equal to four for the sake of simplification; the last deflection means of the input module $APAM^E$ and the first deflection means of the output module $APAM^S$ are denoted by 15 and 16 and lie in the object and image focal planes 51 and 52, respectively. The four angular values of the input and output deflection positions of the linking module 50 associated with each of the elements $DE^{NE}$ and $DE^{1S}$ are denoted, in simplified indexing, by $\theta^E_{11}, \theta^E_{21}, \theta^E_{31}, \theta^E_{41}$ and $\theta^S_{11}, \theta^S_{12}, \theta^S_{13}, \theta^S_{14}$ in the case of the elements $DE^{NE}_1$ and $DE^{1S}_1$, $\theta^E_{12}, \theta^E_{22}, \theta^E_{32}, \theta^E_{42}$ and $\theta^S_{21}, \theta^S_{22}, \theta^S_{23}, \theta^S_{24}$ in the case of the elements $DE^{NE}_2$ and $DE^{1S}_2$, ... $\theta^E_{14}, \theta^E_{24}, \theta^E_{34}, \theta^E_{44}$ and $\theta^S_{41}, \theta^S_{42}, \theta^S_{43}, \theta^S_{44}$ in the case of the elements $DE^{NE}_4$ and $DE^{1S}_4$, respectively. In FIGS. 6a and 6c, only the angular values $\theta^E_{14}, \theta^E_{24}, \theta^E_{34}, \theta^E_{44}$ and $\theta^S_{41}, \theta^S_{42}, \theta^S_{43}, \theta^S_{44}$ of deflection positions associated with the respective elements $DE^{NE}_4$ and $DE^{1S}_4$ have been indicated so as not to overload the illustration.

Of course, all the $\theta^E$ and $\theta^S$ values are such that all the $\theta^E_{ij}$ values of the same index i and all the values $\theta^S_{ij}$ of the same index j are equal because of the positions of the elements $DE^{NE}$ and $DE^{1S}$ in the object and image focal planes 51 and 52, respectively, of the optical focusing means 55.

The position of the centers of the elements $DE^{NE}_{ie,je}$ and $DE^{1S}_{is,js}$ of the respective deflection means $DM^{NE}$ and $DM^{1S}$ is entirely defined by the values of the angular deflection angles $\theta^E_{is,js,ie,je}$.

In the plane of the figure, a simple mathematical relationship makes it possible to calculate these positions defined by the respective distances $d^{NE}_{ie,je}$ and $d^{1S}_{is,js}$ (indexed more simply by $d_{1e}, d_{2e}, d_{3e}, d_{4e}$ and $d_{1s}, d_{2s}, d_{3s}, d_{4s}$ in FIGS. 6a and 6c) at the centers $O^{NE}$ and $O^{1S}$ (simply denoted by $O_e$ and $O_s$ in the same figures) of the deflection means $DM^{NE}$ and $DM^{1S}$ according to the angles $\phi$ and $\theta^E_{is,js,ie,je}$ (defined algebraically with respect to the direction of the optical axis of the system):

$$d^{NE}_{ie,je} = f_{LM} \tan \theta^E_{is,js,ie,je}/(\cos \phi + \sin \phi \tan \theta^E_{is,js,ie,je})$$

$$d^{1S}_{is,js} = f_{LM} \tan \theta^E_{is,js,ie,je}/(\cos \phi - \sin \phi \tan \theta^E_{is,js,ie,je})$$

It should be noted that the distances $d^{NE}_{ie,je}$ and $d^{1S}_{is,js}$ result in separations that are not constant between the positions of the centers $O^{NE}_{ie,je}$ and $O^{1S}_{is,js}$ of the elements $DE^{NE}_{ie,je}$ and $DE^{1S}_{is,js}$, this being so even in the case in which $\phi = 0$. This situation is, of course, the same for the set of input and output optical means involved in the system (deflection means and associated conjugation means, shaping means, optical fibers, etc.) that are positioned relative to the deflection means $DM^{NE}$ and $DM^{1S}$, respectively, by translation parallel to the optical axis of the system.

We also note that there is only inversion with respect to the optical axis of the system between the positions of the constituent elements of the various optical means of the input and output subsystems that may therefore have identical configurations.

Two points must now be taken into consideration in order to obtain a technically achievable routing system: namely the overall size and optical aberrations.

Application of the mathematical formulae for calculating $d^{NE}_{ie,je}$ and $d^{1S}_{is,js}$ shows that, for typical values of the order of a few millimeters between the positions of the centers $O^{NE}$ and $O^{1S}$ and of the order of $10^{-3}$ radians of the separations between the angular deflection positions (typically achieved with uniaxial mirrors having two deflection positions separated by $8 \times 10^{-3}$ radians and a cascade of, for example, five deflection means giving thirty-two angular deflection positions arranged linearly), the necessary focal length $f_{LM}$ is greater than one meter!

The solutions consist either in increasing the angular separation between the deflection positions, which in certain cases may be difficult (for example, it may result in more complex micromirror technologies) or in introducing optical divergence means ODM for increasing the divergence of the output beams $DB^E_{is,js,ie,je}$ output by the elements $DE^{NE}_{ie,je}$ of the deflection means $DM^{NE}$ and then reducing, by the same value, the divergence of the beams $FDB^S_{is,js,ie,je}$ focused on the elements $DE^{1S}_{is,js}$ of the deflection means $DM^{1S}$.

Figure 6D:
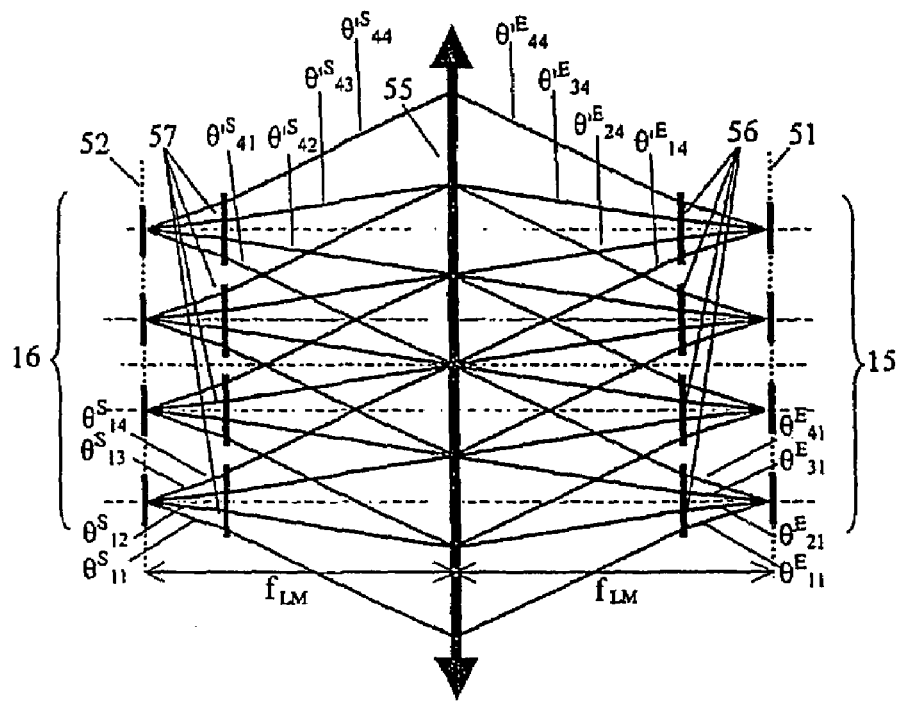
Figure 6E:
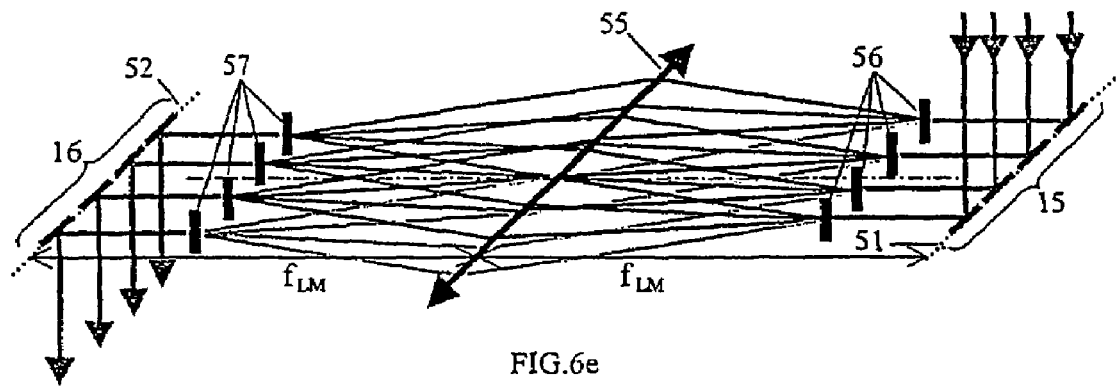

This configuration is shown in FIG. 6d ($\phi = 0$) and FIG. 6e ($\phi = 45°$) that are derived from FIGS. 6a and 6c, but with introduction of the optical divergence means 56 and 57.

These optical divergence means ODM may be matrices of refractive optical elements (divergent microlenses of short focal lengths $f_{ODM}$ as shown in FIG. 6d or convergent microlenses) or possibly reflective optical elements (short focal-length micromirrors). They produce the optical conjugation of the various elements $DE^{NE}_{ie,je}$ with a magnification $G_{ODM}$ of less than 1 and therefore an angular enlargement $1/G_{ODM}$ of greater than 1. The angular values $\theta^E_{is,js,ie,je}$ become $\theta'^E_{is,js,ie,je}$ and the angular values $\theta^S_{is,js,ie,je}$ become $\theta'^S_{is,js,ie,je}$ (see FIG. 6d for the details and FIG. 6e in which only the amplified differences of the angular values $\theta'^E_{is,js,ie,je}$ and $\theta'^S_{is,js,ie,je}$ have been reproduced).

It is therefore easy to see that, in this type of configuration, the focal length $f_{LM}$ is divided by a value of the order of $G_{ODM}$.

If $G_{ODM}$ is chosen to be equal to 10 for example, $f_{LM}$ will, with the same parameters as previously, now be only of the order of some ten centimeters.

However, the problem of optical aberrations posed by the inclination of the optical focusing means OFM remains, particularly in the case of high angles $\phi$ (for example, 45° as in the illustrations shown in FIGS. 6c and 6e).

Figure 6F:
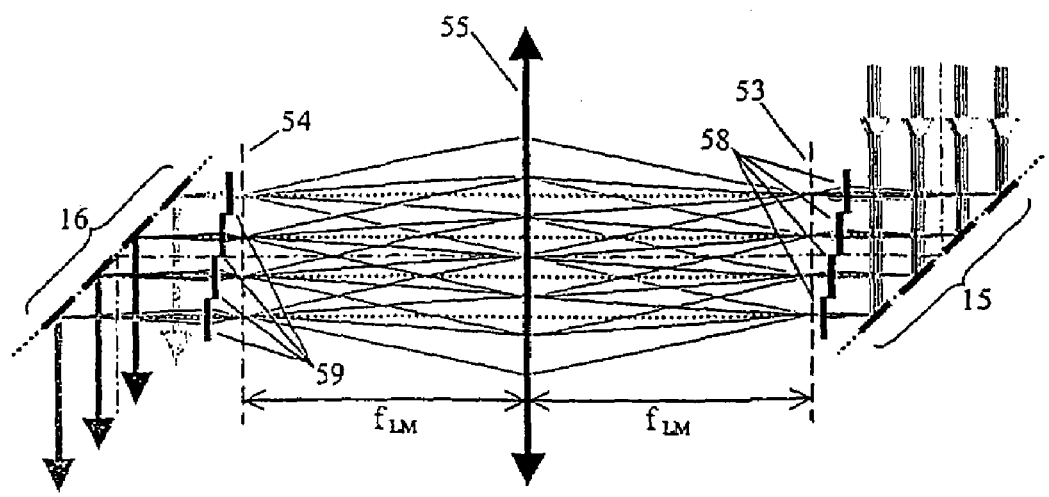

It is possible to overcome the problem by using the configuration shown in FIG. 6f in which angular tilting optical means ATOM 58 are inserted, which means produce the image of the various elements $DE^{NE}_{ie,je}$ in an OFP plane 53 perpendicular to the optical axis of the system with a constant magnification $G_{ATOM}$.

This configuration may, for example, be obtained with ATOM modules composed of optical conjugation elements (in general, convergent or divergent microlenses, or micromirrors, in a configuration similar to that of the elements of the other subsystems), each possessing a focal length $f_{ATOM,ie,je}$ suitable for producing the desired configuration, the value of which is such that:

$$f_{ATOM\,ie,je} = D_{ie,je} \times (G_{ATOM}/(G_{ATOM}+1)^2)$$

where $D_{ie,je}$ is the distance between the element $DE^{NE}_{ie,je}$ of the deflection means $DM^{NE}$ and the OFP plane 53 coincident with the object focal plane 51 of the optical focusing means OFM.

The distances $D'_{ie,je}$ and $D''_{ie,je}$ separating each conjugation element of the ATOM module 58 of the corresponding deflection element $DE^{NE}_{ie,je}$ and of the OFP plane, respectively, are equal to:

$$D'_{ie,je} = D_{ie,je} \times G_{ATOM}/(G_{ATOM}+1)$$

$$D''_{ie,je} = D_{ie,je} \times 1/(G_{ATOM}+1)$$

In FIG. 6f, the various elements 58 of the ATOM module are convergent microlenses.

A similar ATOM module (composed of elements 59 similar to the elements 58) but inverted with respect to the optical axis of the system will also be introduced in order to perform the conjugation of the IFP plane 54, coincident with the image focal plane 52 of the optical focusing means OFM, with the various elements $DE^{1S}_{is,js}$ of the deflection means $DM^{1S}$ as shown in FIG. 6f.

Of course, it is clear that, by choosing the magnification $G_{ATOM}$ to be less than 1, the size and optical aberration problems of the linking module LM are solved at the same time, since the focusing means works perpendicular to the optical axis of the system and the divergence angle of the beams $DB^E_{is,js,ie,je}$ is multiplied by the value $1/G_{ATOM}$, which is greater than 1.

Output Subsystem for Deflecting and Redirecting the Optical Beams:

This subsystem denoted by 35 in FIG. 2 is not shown in detail, as it is similar to the input deflection subsystem, a representative example of which is given in FIG. 4. It uses an output module $APAM^S$ involving, as in the case of the module $APAM^E$, a cascade of at least N deflection means $DM^{1S}, DM^{2S}, \ldots DM^{iS}, \ldots DM^{NS}$, such that two consecutive means $DM^{i+1,S}$ and $DM^{iS}$ are optically conjugate via the optical conjugation means $OCM^{iS}$ with the magnification $G_{i+1,i}$.

The purpose of this subsystem is to rectify the rays $FDB^S_{is,js,ie,je}$ incident on the elements $DE^{1S}_{is,js}$ of the deflection means $DE^{1S}$ so as again to make them parallel to the optical axis of the system.

It therefore has to be possible, using the cascade of deflection means $DM^{1S}, DM^{2S} \ldots DM^{NS}$, to bring the set of angular deflection values $\theta^S_{is,js,ie,je}$ that the various focused rays $FDB^S_{is,js,ie,je}$ can adopt to the value zero. This angular rectification is shown symbolically in FIG. 7 by the decreasing thickness of the lines of the various families of rays 214, 213, 212.

The module $APAM^S$ involves the same number N of deflection means $DM^{iS}$ as the input APAM module $APAM^E$ so as to possess the same number $N'_S \times N''_S$ of angular deflection positions as the latter and be able to rectify all the potential rays $FDB^S_{is,js,ie,je}$ using suitable addressing of each of the elements of the various deflection means $DM^{1S}, DM^{2S} \ldots DM^{NS}$.

Each of the deflection means $DM^{1S}, DM^{2S} \ldots DM^{NS}$ of the module $APAM^S$ will posses $N'_S \times N''_S$ deflection elements $DE^{1S}_{is,js}, \ldots DE^{2S}_{is,js}, \ldots DE^{NS}_{is,js}$. The number $N'_S \times N''_S$ may be greater than but is usually equal to the number $N'_E \times N''_E$ of deflection elements $DM^{1E}_{ie,je}, DE^{2E}_{ie,je}, \ldots DE^{NE}_{ie,je}$ of the deflection means of the input cascade $DM^{1E}, DM^{2E}, \ldots DM^{NE}$ (see the comment in this same section).

Output by the deflection elements $DE^{NS}_{is,js}$ of the last deflection means $DM^{NS}$ of the module $APAM^S$, there are therefore $N'_S \times N''_S$ rectified output optical beams $OB_{is,js}$ that may come from any one of the $N'_E \times N''_E \times N'_S \times N''_S$ optical beams $DB^E_{is,js,ie,je}$ that may be potentially generated by the module $APAM^E$ and focused by the linking module LM depending on the $N'_E \times N''_E \times N'_S \times N''_S$ beams $FDB^S_{is,js,ie,je}$.

Output Subsystem for Shaping the Optical Beams:

This subsystem denoted 45 in FIG. 2 makes it possible to shape the $N'_S \times N''_S$ output optical beams $OB_{is,js}$ angularly rectified by the output module $APAM^S$ and therefore all again made parallel to the optical axis of the system. It is similar to the subsystem for shaping the input optical beams 35 shown in detail in FIGS. 4a and 4b.

It will be denoted by the abbreviation $SM^S$ (output Shaping Module).

It will comprise $N'_S \times N''_S$ refractive (microlens) or reflective (micromirror) optical focusing elements $FE^S_{is,js}$ arranged in the same geometrical configuration as the other elements of the routing system and each will focus $N'_S \times N''_S$ rectified optical beams $OB_{is,js}$ 212 output by the elements $DE^{NS}_{is,js}$ of the last deflection means $DM^{NS}$ of the output module $APAM^S$ into each of the corresponding outgoing optical fibers $OF^S_{is,js}$.

The focal length $f_{MFS}$ of the optical output shaping elements is calculated so as to transform each of the optical beams $DB^S_{is,js,ie,je}$, that have remained Gaussian during the various conjugation operations performed, into a beam, still Gaussian but one whose waist $\omega_{FOS}$ is again matched to that of the outgoing optical fibers $OF^S_{is,js}$.

Usually, the outgoing optical fibers $OF^S_{is,js}$ will be identical to the incoming optical fibers $OF^E_{ie,je}$ with, in particular, a Gaussian mode of waist $\omega_{FOS}$ identical to the waist $\omega_{FOE}$ of the incoming optical fibers. Since the input deflection module $APAM^E$ comprises the same number of optical conjugations as the output deflection module $APAM^S$, but with an inverse total magnification $1/GT$ ($G_T = \pi_{1 \to N-1} G_{i+1,i}$), the waist $\omega_{FIS}$ of the $N'_S \times N''_S$ optical beams $OB_{is,js}$ will be equal to the waist $\omega_{FIE}$ of the incident beams $IB^E_{ie,je}$ and the focal length $f_{MFS}$ of the shaping elements of the output module $SM^S$ will in general be identical to that $f_{MFE}$ of the shaping elements of the input module $SM^E$.

Figure 7:
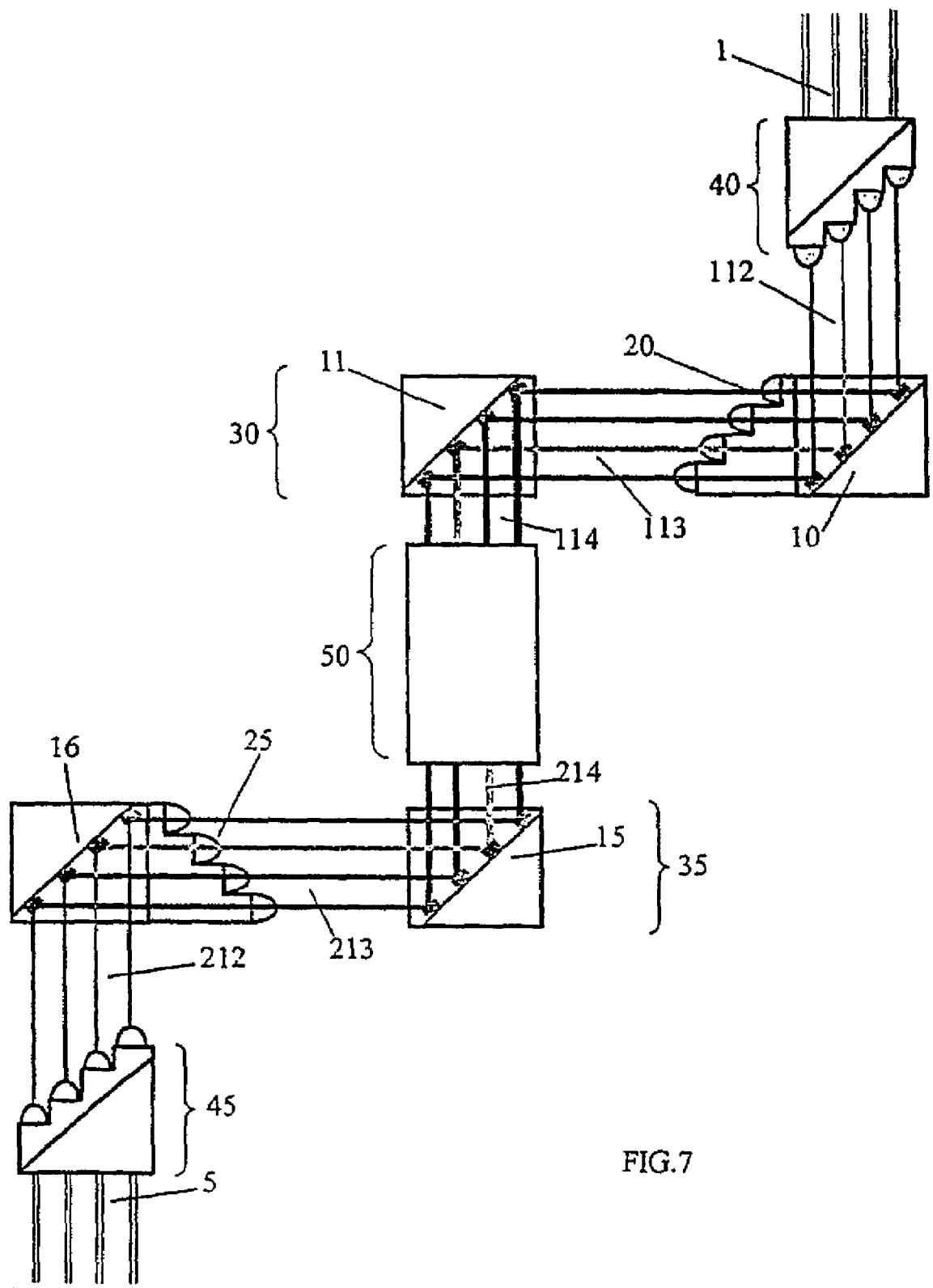
FIG. 7 shows an example of one possible embodiment of a point-to-point router according to the invention.

FIG. 7 gives an example of one possible embodiment of a point-to-point router using APAM modules composed of a cascade of two deflection means each with four elements.

4.2 Power Splitter Divider:

In this type of router, the power (and consequently all the data of the various modes) transported by the $N_E$ incoming fibers is split and each of the various fractions thus created is redirected toward an outgoing fiber. The splitting may be carried out by splitting the power transported by each incoming fiber into K equal (the most common case) or unequal parts.

Figure 3B:
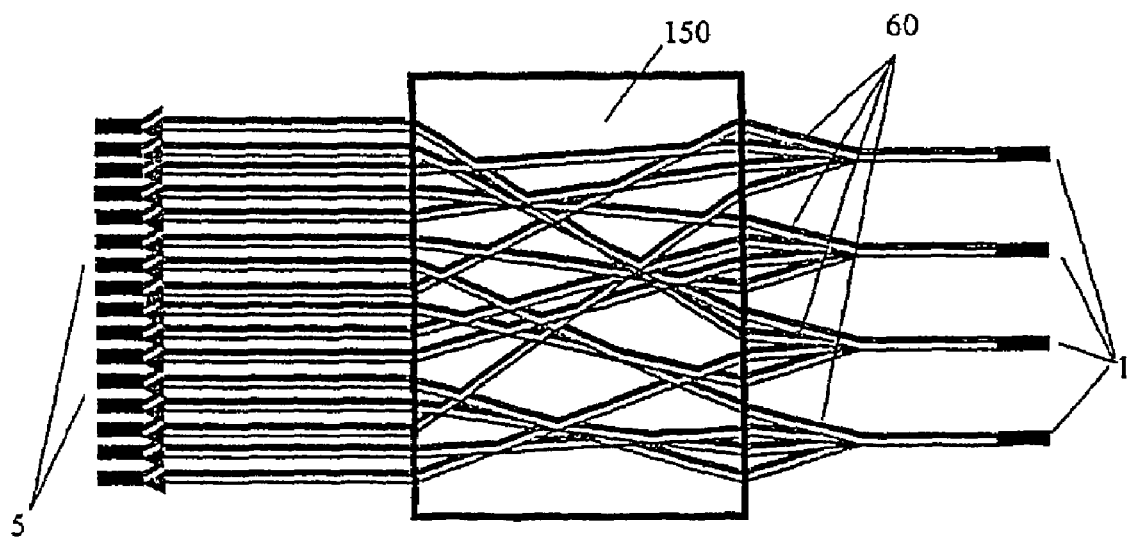

This type of router is shown schematically in FIG. 3b. It differs from the previous one only by the addition at the output of each incoming fiber of a power splitter component 60 that splits the light power and therefore all the data transported by each incoming fiber into K usually equal parts. FIG. 3b shows such a device in the case in which the number $N_E$ of incoming fibers is equal to 4 and the factor K is also equal to 4, thus generating sixteen different beams that will then be able to be directed toward any one of the outgoing fibers (at least sixteen) via a point-to-point router identical to the previous one.

More generally, there will have to be at least $K \times N_E$ outgoing fibers so that all the input optical beams $IB_{ie,je}$ (ie varying from 1 to $N_E$ and je from 1 to K) generated can find a receiving outgoing fiber.

Strictly speaking, the power of the incoming fibers can be split not with the same factor K, but with different factors $K_{ie}$ for each incoming fiber $OF_{ie}$; in this case, there will have to be at least $\sum_{1}^{Ne} K_{ie}$ outgoing fibers. In the rest of the presentation and without this impairing the generality of the invention, we will assume that K is the same for all the incoming fibers.

We also note that, in this type of splitter, the power splitting is carried out whatever the wavelength conveyed by the fiber, as shown schematically in FIG. 3 by multicolor lines indicating the various optical beams generated.

The beam splitter may be of a different kind and involve either integrated optics techniques with splitters 130 formed by the combination of light guides and of Y junctions on a chip (commercially available 1→8 splitters, 1→16 splitters, 1→32 splitters, etc.), as shown in FIG. 8, or fiber optic techniques (splitters available with low splitting factors K) or else free-space optics techniques.

In the first two cases, the power splitters will generally be connected directly to the incoming optical fibers and the input configuration will be identical to that of the previous router, but with the number $N_E$ of beams $IB_{ie,je}$ to be redirected simply being replaced with $K \times N_E$ beams, the shaping of the beams $IB_{ie,je}$ taking place in the same way after the splitters.

In the case of splitter modules 60 produced in free-space optics, the light power splitting and shaping of the beams may be carried out by the same module such as, for example, the module shown in FIG. 9, which comprises:

- a first linear array 61 of cylindrical or cylindro-spherical lenses making it possible both to collimate each of the $N_E$ beams output by the linear array of $N_E$ incoming fibers 1 in the direction of the axis OX of this linear array and favorably to increase their angular aperture $\Delta\beta$ in the planes perpendicular to OX so as to form $N_E$ unsymmetrically shaped optical beams 64 as shown in FIG. 9;
- a second linear array 62 of cylindrical or cylindro-spherical lenses making it possible to collimate the $N_E$ unsymmetrical optical beams obtained; and
- a matrix 63 of spherical microlenses or micromirrors making it possible to form the $K \times N_E$ parallel input optical beams $IB_{ie,je}$ 112 (ie varying from 1 to $N_E$ and je from 1 to K) with the desired angular aperture and the desired spatial distribution.

The focal lengths of the various elements of the splitter module that are thus formed will be chosen according to the desired number K, the desired geometrical spacing for the $K \times N_E$ input optical beams and the available space.

The drawing shown in FIG. 9 involves a linear array 1 of incoming fibers for the sake of simplifying the presentation. It is clear that configurations of incoming optical fibers in the form of matrices can be used provided that account is taken of the size of the elements of this matrix and the space that the K beams generated by the splitter module will occupy in the routing system. In any case, this matrix will always be highly unsymmetrical with mean spacings between fibers approximately K times larger in one direction than in the other; in the case of the splitter module shown in FIG. 9 there will be, for example, mean spacings in the direction OY that are approximately K times those shown in the direction OX. Of course, it is possible to imagine a configuration in which the geometries of the matrix between the directions OX and OY are switched over.

Figure 3C:
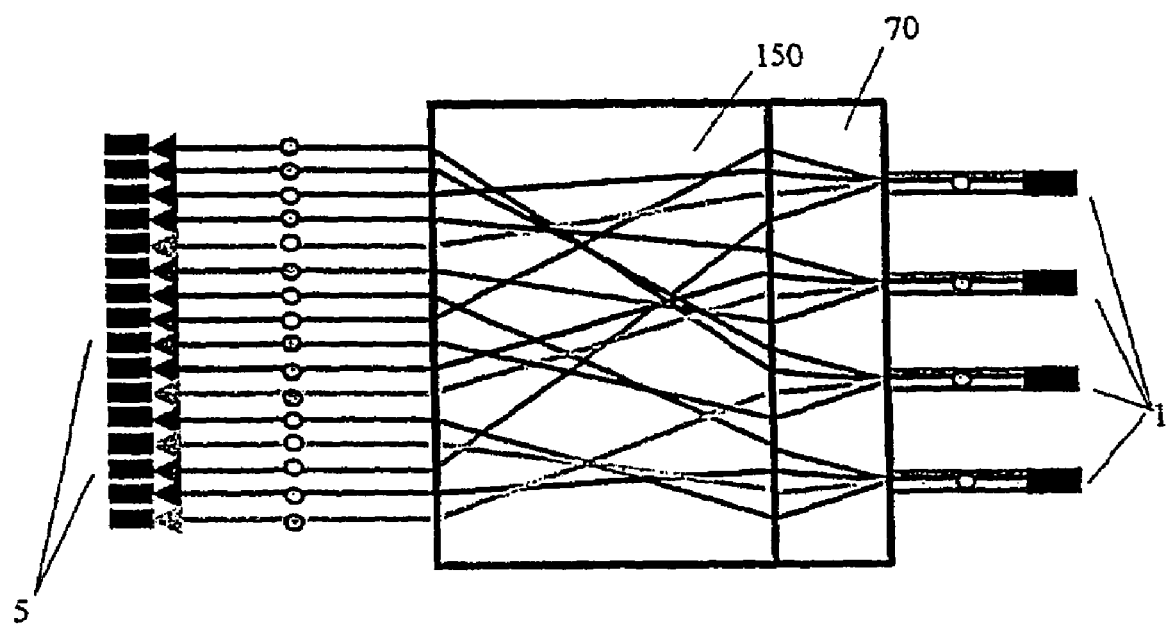

4.3 Wavelength Demultiplexer Router:

This type of router derives from the previous router simply by replacing the power splitter module with a wavelength demultiplexer module 70 as shown in FIG. 3c.

If each of the $N_E$ incoming optical fibers transport L different wavelengths $\lambda_1, \lambda_2 \ldots \lambda_L$, the demultiplexer module will generate, for each of the incoming fibers, L optical beams and the problem will therefore amount to that of the point-to-point router of section 4.1 with a number of beams $IB_{ie,je}$ to be managed equal to $L \times N_E$ (ie varying from 1 to L and je from 1 to $N_E$).

As in the case of the power splitter router, the demultiplexer module may be produced either in integrated optics 140, as shown in FIG. 10 with commercially available components of the AWG (Array Waveguide Grating) type that can be connected directly to the incoming fibers, the subsystem for shaping the $L \times N_E$ optical beams generated being placed after the demultiplexer module and being similar to that described in section 4.1, or produced in free space optics, as shown in FIG. 11 in an illustrative configuration.

In this FIG. 11, the wavelengths are demultiplexed by a diffraction grating 72, the lines of which are parallel to the axis OX of the linear array of incoming fibers. After suitable shaping in terms of angular aperture by a linear array of collimating microlenses 71 (generally spherical microlenses), each wavelength $\lambda_1, \lambda_2 \ldots \lambda_L$ transported by each of the incoming fibers is diffracted at an angle $w_1, w_2 \ldots w_L$.

On the output side of the diffraction grating, the line spacing of which is matched to the separation $\Delta\lambda$ (generally constant between the various wavelengths to be separated), there are therefore $N_E$ families of L angularly separated optical beams 73 of different wavelengths. These beams must be redirected in the same direction (the direction of the optical axis of the router), for example by the linear array of parabolic mirrors 74.

On the output side of the demultiplexer module, there is therefore the generation, as desired, of $L \times N_E$ parallel beams 2 that can be indexed $IB_{ie,je}$ (ie varying from 1 to L and je from 1 to $N_E$).

A matrix of $L \times N_E$ conjugation elements (this not being shown in FIG. 9) may optionally be inserted between the linear array of mirrors 74 and the input deflection subsystem in order to match the angular aperture of the optical beams to the parameters of the router.

It should be noted that, in the matrix of incident beams thus formed, each beam belonging to one and the same index row, ie possesses the same wavelength, which can thus be indexed as $\lambda_{ie}$ (ie varying from 1 to L and $\lambda_{ie}$ therefore taking the values $\lambda_1, \lambda_2 \ldots \lambda_L$).

As in the previous section, the incoming fibers arranged in linear arrays in FIG. 11 for the sake of simplification may be configured in matrices with the same constraints already mentioned. Likewise, it is of course always possible in the invention for the roles of the rows and columns in the matrices in question to be switched over.

Figure 3D:
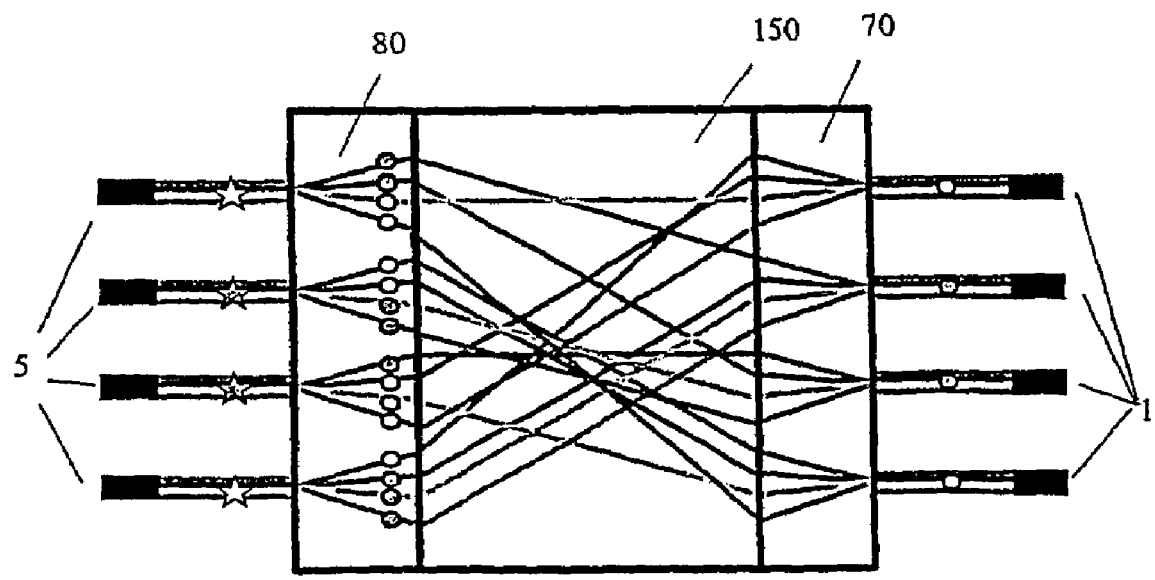

4.4 Wavelength Demultiplexer/multiplexer Router:

This type of router corresponds to the planar schematic representation shown in FIG. 3d and the matrix schematic representation shown in FIG. 12.

On the input side, it possesses a configuration identical to the demultiplexer router, but each of the $N_E$ data modes of the same wavelength $\lambda_{ie}$ transported by any incoming fiber $OF_{je}$ of the linear array of incoming fibers 1 is mixed and redirected by the router and then remultiplexed toward any one outgoing fiber 5. Unlike the previous demultiplexer router, each outgoing fiber receives not a single data mode but L modes emanating from any one of the incoming fibers, each mode being associated with a separate wavelength $\lambda_{ie}$.

The previous router required at least $L \times N_E$ outgoing fibers, whereas the demultiplexer/multiplexer router now requires only at least $N_S = N_E$ outgoing fibers.

The operation of this router will be more fully understood from the diagram shown in FIG. 12, in which each of the data modes injected into the various outgoing fibers is distinguished by its input wavelength $\lambda_{ie}$ (color of the various light rays) and by its original incoming fiber (round areas of different colors). To obtain this functionality, it is necessary to use the following succession of subsystems:

- a demultiplexer module 70 as described above, that generates, for a linear array of $N_E$ incoming fibers each transporting L wavelengths, a matrix of $L \times N_E$ optical beams parallel to the optical axis of the system $IB_{ie,je}$ (see FIG. 12). In this matrix, the column index je represents the number of the incoming fiber generating the beam (je varies from 1 to $N_E$) and the row index ie represents the transported wavelength $\lambda_{ie}$ (ie varies from 1 to L);
- a point-to-point router for switching, in any manner, the set of beams $IB_{ie,je}$ on the same row ie of the matrix thus formed, that is to say to switch the set of $N_E$ beams of the same wavelength $\lambda_{ie}$ of this row. This operation may be carried out by a point-to-point router using input and output deflection subsystems, each involving an APAM module (described in the previous invention) operating with linear deflection (i.e. the beams of which are deflected in a plane parallel to the direction defined by the rows of the matrix of the incident optical beams $IB_{ie,je}$ and the optical axis of the system) and a linking module LM similar to that described in detail in section 4.1.

The point-to-point router proposed therefore allows all the optical beams of the wavelength to be crossconnected, but must not allow switching between the rows as shown in FIG. 12 so that a multiplexer 80 similar to the input demultiplexer can collect each of the L modes of any column js of the matrix of the output optical beams (each mode transporting its data on a carrier light wave of wavelengths $\lambda_1, \lambda_2 \ldots \lambda_L$) in the corresponding outgoing fiber $OF_{js}$; and

- an output multiplexer module 80 similar to the input demultiplexer module 70, which therefore makes it possible to collect each of the L optical beams of a column of index js onto the corresponding outgoing fiber $OF_{js}$.

4.5 Generalized Demultiplexer/multiplexer Router:

The above demultiplexer/multiplexer router may be generalized so as to produce all the routing configurations between the case illustrated in FIG. 3c, in which each mode of wavelength $\lambda_{ie}$ and coming from the incoming fiber $OF_{je}$ is directed toward a separate outgoing fiber (demultiplexer router) and the case illustrated in FIGS. 3d and 12, in which each of the outgoing fibers receives L modes of different wavelength.

Figure 1:
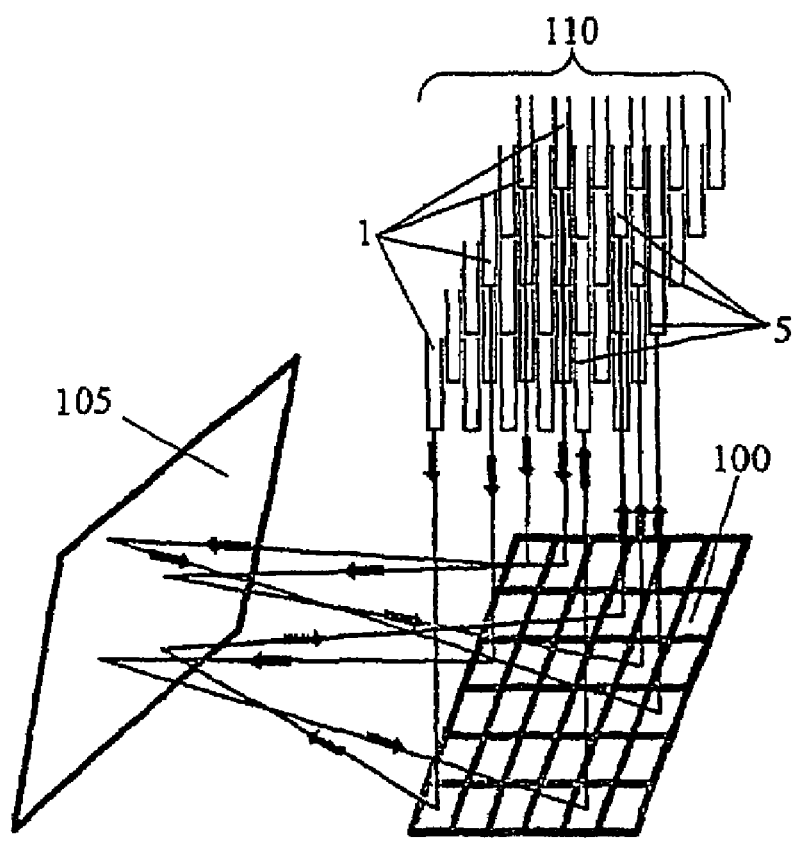
FIG. 1 shows a schematic representation of optical routers of the "free space" type that have been developed at the present time.

The minimum number of outgoing fibers $N_{Smin}$ required for correct operation of the router, for which at least one outgoing fiber corresponds to each input mode, is $N_{Smin} = L \times N_E$ in the configuration shown in FIG. 1c (demultiplexer router) and $N_{Smin} = N_E$ in the case of FIGS. 3d and 12 (demultiplexer/multiplexer router).

It may in certain configurations of communication networks be advantageous to be able to have intermediate configurations accessible, in which, for example, only L' of the L wavelengths transported by each of the incoming fibers can be taken and directed toward separate outgoing fibers, the L–L' remaining wavelengths being directed, for each of the incoming fibers, toward a single outgoing fiber. In this situation, the minimum number of outgoing fibers necessary will be $N_{Smin} = (L'+1) \times N_E$; if L'=1 (one wavelength taken per incoming fiber), there will have to be at least $2 \times N_E$ outgoing fibers.

All these configurations, that may be denoted by the name "generalized add and drop" can be achieved using the demultiplexer/multiplexer router of section 4.4.

To do this, all that is required is to use a point-to-point router subsystem identical to that described in section 4.4, but that allows routing of the $N_E$ input beams making up each of the rows no longer toward at least $N_S = N_E$ output beams by rows but toward at least $N_S = (L'+1) \times N_E$, it being possible for L' to vary from 0 (in the case of the demultiplexer/multiplexer router without possible redundancy of FIGS. 3d and 12 in which $N_S = N_E$) to L–1 (the case of the demultiplexer router without possible redundancy of FIG. 3c in which $N_S = L \times N_E$). This implies, in the most complex case, that the cascade of deflection means of the two linear-deflection modules APAM involved in the point-to-point router will have to allow at least $L \times N_E$ angular deflection positions to be generated.

4.6 Checking the Operation of the Various Routers:

As in the invention described in the patent application filed on the same day relating to APAM modules, it is generally essential to be able to permanently ensure that the routing system is operating correctly and in particular it is essential that the active elements involved do occupy the various programmed positions.

This check may be made in a manner similar to that described in the case of the APAM modules, by removing, at each stage of the two APAM modules, some of the data representative of the configuration state of the angular deflection positions actually adopted with respect to the programmed state. This removal (see FIGS. 13a and 13b) may be accomplished directly on the signal beams 162 via suitable splitter plates 160, at the cost of an overall higher loss, or more favorably on additional beams 163 superimposed on the signal beams via dichroic splitter plates 161.

The checking module 90 may, as in the patent application filed on the same day, consist of the following elements (FIGS. 13a and 13b):

- an optical projection module OPM 164, consisting for example of a linear array or a matrix of suitable microlenses or micromirrors, making it possible to convert, for each deflection element to be checked, the generated angular deflection positions into spatial positions on a one-to-one basis;
- a position detector 165 favorably placed at or near the focal plane of the various elements of the module OPM and all the detection points of which are in a geometrical configuration homothetic with the figure of the angular deflection positions to be checked. This position detector may, for example, be a linear array or a matrix of photodetectors of the CMOS type; and
- optionally, an optical image reduction system 166, possibly placed in front of the optical module OPM in order to match the dimensions of the deflection means of the APAM module to those of the position detector.

Of course, the checking elements may be placed at each stage of the two APAM modules in order to have a check of all the deflection elements involved in the router or, for example, only on the output side of these modules and to have only an overall check of the state of the system. These checking means described in detail in the patent application filed on the same day are illustrated schematically in FIG. 13.

FIG. 14 show examples of possible configurations of the routers of the invention for various complexities of APAM modules.

FIG. 14a illustrates a router that involves APAM modules with a cascade of two deflection means. This figure shows schematically the key elements of a router with the incoming fibers 1 and outgoing fibers 5, the input and output shaping subsystems 40 and 45, each composed of an APAM module with two deflection means 10 and 11 and 15 and 16, each corresponding element of which is optically conjugate with respect to the conjugation means 20 and 25, the input and output deflection subsystems 30 and 35 and the linking module 50.

The other figures, 14b, 14c and 14d, involve APAM modules respectively having three, four and five deflection means (denoted by 10, 11, 12, 13, 14, etc. on the input side and 15, 16, 17, 18, 19, etc. on the output side) and the corresponding elements of two consecutive deflection means of which are optically conjugate with respect to the conjugation means 20, 21, 22, 23, etc. on the input side and 25, 26, 27, 28, etc. on the output side.

Assuming that the deflection means are composed of 2-spindle/2-position mirror elements (see the patent application filed on the same day), the various configurations shown in FIGS. 14a, 14b, 14c and 14d allow the production of point-to-point routers of increasing complexity comprising 16 inputs/16 outputs, 64 inputs/64 outputs, 256 inputs/256 outputs and 1024 inputs/1024 outputs, respectively.

4.7 Linking Module: a Variant

In the configurations described hitherto, each element of the deflection matrices involved in the various modules corresponds to an incoming fiber and the input and output modules are separate.

It may be beneficial to use the same matrices of deflection elements (and consequently also the same matrices of beam-shaping or conjugation microlenses) to obtain a more compact system and/or to simplify the packaging (half the number of elements to be aligned). This variant is shown in FIG. 15. In this case, of course, half the elements of each matrix involved is reserved for the input optical beams 2 and forms the subsystems 40 and 30, while the other half is reserved for the output beams 6 and forms the subsystems 45 and 35 (see FIG. 16). This operation may be performed by the optical arrangement shown in FIG. 15 in which there has been incorporated, into the linking module LM 50, a deflection mirror 300, the image focal plane $F_{IM}$ of which is coincident with the image focal plane $F_{IL}$ 52 of the focusing lens 55, the rest of the configuration of the linking module remaining the same.

FIG. 15 shows schematically, for better understanding, the operating mode of a router of this type produced from linear arrays of eight elements, the upper four elements seeing the input beams and the lower four elements seeing the output beams.

Of course, the arrangement can be generalized to the case of matrices of any dimensions, the elements corresponding to the output beams being symmetrical, with respect to the center of the matrix, elements corresponding to the input beams.

Depending on the total angular aperture occupied by all the beams involved, the deflection mirror may be spherical or parabolic.

The configuration shown in FIG. 15 is an in-line configuration for the sake of simplification, but the arrangement proposed applies in the same way to configurations for which the angle of inclination $\phi$ is not zero, with embodiments similar to those described in section 4.1 devoted to the linking module.

4.8 Optimization of the Routing System: Favorable Position of the Waists of the Gaussian Light Beams As was emphasized at the start of section 4, the light beams emanating from the various optical fibers may be likened to Gaussian beams, the Gaussian shape of which is maintained during the various optical conjugation operations.

On leaving the optical fiber, the beam possesses a minimum radius $\omega_{FOE}$ usually called the waist; it then diverges hyperbolically, the two asymptotes of which are angularly separated by an angle $\Delta\phi_{FOE}$ whose value is (see FIG. 3):

$$\Delta\phi_{FOE}=2\lambda/\pi\times\omega_{FOE}$$

$\Delta\phi_{FOE}$ is the angular aperture (or divergence) of the Gaussian beam emanating from the optical fiber. After collimation by the microlenses of the shaping subsystem 40, these beams remain Gaussian with a waist of size $\omega_{FIE}$ and an angular aperture:

$$\Delta\phi_{FIE}=2\lambda/\pi\times\omega_{FIE}$$

In an optical imaging system involving Gaussian beams, the position of the waists obeys conjugation rules similar to those governing the geometrical optics, except near the foci of the imaging optics. Without going into details of the equations that allow the position of the object waist and image waist that are given by a lens to be calculated, it is necessary to note that the main difference is that, if the position of the Gaussian beam waist lies at the object focus of the lens, the position of the image waist will not be at infinity, as conventional object-image conjugation would wish, but at the image focus of this lens.

In the case of the device of the invention, it may be beneficial for the position of the waists of the various light beams involved to lie in the plane of the elements of the various deflection means for two reasons:

- the waist corresponding to the minimum dimension of a Gaussian beam, it is in this situation that the mirrors of the device will have the minimum dimensions (smallest size and greatest ease of producing the mirrors in microtechnologies);
- at the waist, the equiphase surface of the Gaussian beam is plane (spherical elsewhere), thereby minimizing the optical aberrations at mirror reflections.

It should be noted here that this advantageous configuration will in general dictate the use of optical conjugation systems, between the deflection elements, composed of lenses (preferably two in number) having focal lengths suitable for producing the necessary magnification $G_{i,i+1}$.

When producing the router, it is therefore sought to be in this situation illustrated in the case of the input shaping module 40, FIG. 4a or 4b, in which the waist $\omega_{FOE}$ of the optical fiber has its image $\omega_{FIE}$ in the plane of the various elements of the first deflection means $DM^{1E}$.

Likewise, the aim will be to produce the same type of conjugation between the waists of the Gaussian beams emanating from the deflection elements $DM^{NE}$ of the last stage of the cascade of input deflection means, and the waists of the corresponding Gaussian beams directed by the linking module toward the deflection elements $DM^{1S}$ of the first stage of the cascade of output deflection means.

In general, it will always be possible to produce this favorable configuration. However, the image waists given by the collimation microlenses of the shaping module are usually not very distant from them because of the short focal length $f_{MFE}$ of these lenses, resulting in difficulties in positioning the first deflection means. It is then favorable to add, after the matrix of shaping lenses 41, a matrix of transport lenses 311 of longer focal length, that allows this problem to be overcome by forming a new, more distant, image of the waist $\omega_{FIE}$. This variant is shown in FIG. 17 in an in-line configuration.

Of course, the same configuration will be used for the output shaping module.

It will be appreciated that the illustrative examples that have just been described, by way of preference, provide:

- a point-to-point optical routing device for directing, in a one-to-one manner, the data transported by any optical fiber among $N_E$ fibers of an array of incoming optical fibers 1 toward any optical fiber among $N_S$ fibers of an array of outgoing optical fibers 5, characterized by the following elements being involved:
  an input shaping subsystem or module 40 composed of input optical means for shaping each of the $N_E$ light beams emanating from each of the $N_E$ incoming optical fibers and for generating $N_E$ parallel optical beams 112 of suitable angular aperture,
  an input deflection subsystem or module 30 for multiplying the number of angular deflection positions of the input light beams and composed of a set of N deflection means $DM^{1E}, DM^{2E}, \ldots DM^{iE} \ldots DM^{NE}$, placed in cascade, each comprising at least $N_E$ deflection elements arranged in a configuration identical to that of the $N_E$ input optical beams and making it possible to generate, for each of these input optical beams, a number $P_{TN}$ of different angular deflection positions at least equal to the number $N_S$ of fibers of the array of outgoing optical fibers,
  a linking module 50 for bringing together, in the same point in space, all the potential mutually parallel deflection positions that the $N_E$ parallel light beams formed by the input shaping subsystem can adopt on the output side of each of the elements of the last deflection means $DM^{NE}$ of the input deflection subsystem. The linking module therefore provides a number $P_{TN}$ of potential spatial focusing points equal to the number $P_{TN}$ of angular deflection positions that are potentially provided by each of the $N_E$ elements of the last deflection means $DM^{NE}$ and ensures one-to-one correspondence between these $P_{TN}$ angular deflection positions and these $P_{TN}$ spatial focusing points,
  an output deflection subsystem 35 that allows the $P_{TN}$ light beams potentially generated on the output side of the linking module 50 to be redirected and is composed of a set of N' (at least equal to N) deflection means $DM^{1S}, DM^{2S} \ldots DM^{iS} \ldots DM^{N'S}$ placed in cascade, each comprising $P_{TN}$ (at least equal to $N_S$) deflection elements and allowing each of the $P_{TN}$ incident light beams to be angularly redirected onto each of the $P_{TN}$ elements of the first deflection means $DM^{1S}$ so as to make them parallel to the same common direction,
  an output shaping subsystem or module 45, composed of output optical means for shaping each of the $P_{TN}$ parallel light beams potentially generated on the output side of the last deflection means $DM^{N'S}$ of the demultiplication subsystem and for matching the optical characteristics of these $P_{TN}$ parallel beams to the optical characteristics of the outgoing optical fibers so as to be able to inject $N_S$ (among $P_{TN}$) of these beams into the $N_S$ optical fibers with the least possible losses;
- an optical routing device of the aforementioned type in which the output input deflection subsystems are modules for multiplying the number of angular deflection positions, which modules are described in the patent application filed on the same day. These modules use a cascade of deflection means $DM^1, DM^2, \ldots DM^i, \ldots DM^N$, the two consecutive means $DM^i$ and $DM^{i+1}$ of which are optically conjugate with respect to optical conjugation means $OCM^i$ with a magnification:

$$G_{i,i+1} = P_i \times (P_{i+1}-1)/(P_i-1)$$

where $P_i$ and $P_{i+1}$ represent the number of angular positions that can be adopted by the deflection elements of the deflection means $DM^{iE}$ and $DM^{i+1E}$. When $P_i = P_{i+1} = P$, then $G_{i,i+1} = P$;

- a routing device of the aforementioned type in which the linking module 50 is formed by a refractive (lens) or reflective (mirror) focusing means 55 for focusing the set of $P_{TN} \times N_E$ light beams potentially deflected by the $N_E$ elements of the last deflection means $DM^{NE}$ of the input deflection subsystem 30 in its image focal plane 52 and thus producing a one-to-one correspondence between the $P_{TN}$ different parallel angular deflection positions (i.e. those that correspond to the same angles of deflection with respect to a common system marker) that are generated by the elements of the last deflection means $DM^{NE}$ and the $P_{TN}$ image foci on which the corresponding $P_{TN}$ potentially deflected beams will converge;
- a routing system of the aforementioned type in which the $N_E$ elements of the last deflection means $DM^{NE}$ of the input deflection subsystem 30 lie in the object focal plane 51 of the focusing means of the linking module 50;
- a routing device of the aforementioned type in which the linking module 50 involves optical means 56 and optical means 57 for respectively increasing and decreasing the angular separations between the $P_{TN}$ deflection positions of the potential light beams respectively generated by each of the elements of the last deflection means $DM^{NE}$ and focused on each of the elements of the first deflection means $DM^{1S}$, these optical means 56 and 57 allowing the dimensions of the linking module to be reduced. In this configuration, the object focal plane 51 and the image focal plane 52 of the focusing means of the linking module coincide respectively with the image planes given by the optical means 56 and 57 for respectively increasing and decreasing the angular separations of the deflection elements of the deflection means $DM^{NE}$ and $DM^{1S}$, respectively;
- a routing device of the aforementioned type in which the linking module 50 comprises a deflection mirror 300, the image focal plane $F_{IM}$ of which is coincident with the image focal plane 52 of the focusing lens 50. This deflection mirror makes it possible to fold the routing system and makes it possible to use the same matrices of elements for the various input and output subsystems: one half of the elements of the various matrices is involved in the case of the input subsystems, the other half, symmetrical with respect to the center of the various matrices, being involved in the case of the output subsystems;

an optical routing device of the aforementioned type in which the incoming fibers 1 and the various input subsystems (input optical shaping means 40, deflection and conjugation means of the input deflection subsystem 30, and possibly optional optical means 56 for increasing the angular separations of the deflection positions of the linking module 50) are arranged in linear arrays of $N_E$ elements or in matrices of $N'_E \times N''_E = N_E$ elements;

an optical routing device of the aforementioned type in which the various output subsystems (optional optical means 57 for decreasing the angular separations of the various deflection positions of the linking module 50, deflection and conjugation means of the output deflection subsystem 55 and output optical shaping means 45) and the outgoing optical fibers 5 are arranged in linear arrays of $N_S$ elements or in matrices of $N'_S \times N''_S = N_S$ elements; the $P_{TN}$ different angular deflection positions generated by each of the elements of the first deflection means $DM^{NE}$ are then configured as linear arrays of at least $N_S$ positions or as matrices of at least $N'_S$ rows and $N''_S$ columns, respectively;

an optical routing device of the aforementioned type in which the various optical collimation or imaging means associated with the various subsystems of the router are linear arrays or matrices composed of elements of the microlens or micromirror type that can be produced by the collective fabrication processes involved in microtechnologies;

a routing device of the aforementioned type in which the deflection means of the input deflection subsystem 30 and the output deflection subsystem 35 are composed of linear arrays or of matrices of electrically addressable mirror elements and lie in parallel planes with a mean angle of inclination φ relative to the general optical axis of the system. In this "folded" configuration, the focusing means 55 of the linking module 50 and the various optical collimation or imaging means associated with the various subsystems of the router also lie in identical parallel planes inclined at the angle φ so as to maintain perfect symmetry between the various families of deflected beams;

an optical routing device of the aforementioned type in which the deflection means of the input deflection subsystem 30 and output deflection subsystem 35 are linear arrays or matrices of electrically addressable elements, of the micromirror type, that can be produced by the collective fabrication processes involved in microtechnologies;

an optical routing device of the aforementioned type in which each of the elements of the various refractive collimation or conjugation optical means involved in the "folded" configurations with an angle of inclination φ is positioned angularly so that its optical axis remains parallel to the overall optical axis (parallel to the mean direction of deflection of the set of deflected beams) of the system so as to minimize the geometrical aberrations affecting the various optical beams involved, while maintaining the symmetry of the system;

an optical routing device in a folded configuration of the aforementioned type, in which the linking module 50 involved in the "folded" configurations with an angle of inclination φ uses angular tilting optical means 58 and 59 for bringing together the various potentially deflected beams on the output side of each of the elements of the last deflection means $DM^{NE}$ in a plane perpendicular to the overall optical axis of the system and then for carrying out the reverse operation on the various beams so as to refocus them onto each of the elements of the first deflection means $DM^{1S}$. These angular tilting means make it possible to use a focusing means 55 of the linking module of the refractive type and to be able to make it work in a configuration perpendicular to the overall optical axis of the system, which allows the optical aberrations induced by the inclination φ to be minimized. These tilting means 58 and 59 may, for example, be formed from linear arrays or from matrices of microlenses or micromirrors, the focal length of the various elements of which is calculated so that each of the optical conjugations involved has the same magnification;

an optical routing device in a folded configuration of the aforementioned type, in which the angular tilting means 58 and 59 act at the same time as means 56 and means 57 for respectively increasing and decreasing the angular separations between the potential deflected beams involved;

a device called a power splitter router, characterized by the introduction, on the input side of the point-to-point router 150 of the aforementioned type, of a component 60 for splitting, for example into K equal or unequal parts, the light power (and therefore all the data transported by each of the optical fibers) of each of the fibers of a linear array of $N_E$ incoming fibers and for providing a matrix of $K \times N_E$ light beams 112, each able to be directed by the point-to-point router 150 toward any one of the outgoing fibers arranged in linear arrays or in matrices, the number $N_S$ of which is at least equal to $K \times N_E$;

a device called a power splitter router of the aforementioned type, characterized by the use of power splitter components 60 produced in integrated optics; each of the power splitter components 130 is connected to an incoming fiber and makes it possible, from the linear array of $N_E$ incoming fibers, to generate a matrix of light beams 112 consisting of K rows and $N_E$ columns that can be shaped by the input shaping subsystem 40 of the point-to-point router 150;

a device called a power splitter router of the aforementioned type, characterized by the use of power splitter components produced in free space optics and comprising:

a first linear array 61 of $N_E$ collimation means (microlenses or micromirrors) that allows the $N_E$ light beams emanating from each of the incoming optical fibers 1 to be collimated in the direction of the axis of the linear array and to leave unchanged or to increase their angular aperture in the orthogonal direction. This first linear array 61, consisting for example of cylindrical microlenses, delivers $N_E$ highly unsymmetrical lines of light 64 directed along axes perpendicular to the plane defined by the axis of the linear array of fibers and the optical axis of the light beams, a second linear array 62 of $N_E$ reflective or refractive collimation means for collimating the $N_E$ lines of light formed, it being possible for these collimation means to be, for example, cylindrical lenses whose axis of convergence is perpendicular to the axis of convergence of the collimation means of the first linear array 61 and the focal length of which is designed to obtain lines of light of suitable geometry and a matrix 63 of $K \times N_E$ refractive or reflective optical shaping means for generating, from the $N_E$ lines of light, $K \times N_E$ light beams 112 having optical characteristics matched to the point-to-point router 150;

a device called an optical-variable demultiplexer router, characterized by the introduction, on the input side of the point-to-point router described above, of a component 70 for separating the various optical variables $v_1$, $v_2 \ldots v_L$, that can be used as medium for the transported data (light wavelengths, temporal lengths of the light pulses, polarization states of the light, etc.). If the optical-variable demultiplexer component 70 in question allows spatial separation of L variables, its connection to each of the optical fibers of a linear array of $N_E$ incoming optical fibers 1 will make it possible to generate $L \times N_E$ light beams 112 (corresponding to $L \times N_E$ data channels) that can be oriented by the point-to-point router 150 toward any one of the outgoing fibers arranged in linear rays or in matrices, the number $N_S$ of which is at least equal to $L \times N_E$;

a device called an optical-variable demultiplexer router of the aforementioned type, characterized by the use of optical-variable demultiplexer components 70 produced in integrated optics, each of the optical-variable demultiplexer components being connected to an incoming fiber and making it possible, from the linear array of $N_E$ incoming fibers 1, to generate a matrix of light beams 112 consisting of L rows and $N_E$ columns that can be shaped by the input shaping subsystem of the point-to-point router 150;

a device called an optical-variable demultiplexer router according to claim 17 and 18, for which the optical variable in question is the light wavelength λ and for which the demultiplexer component 70 used is denoted, in integrated optics, by the term AWG (Array Waveguide Grating) or "phasar" (standing for phase array) 140;

a device called an optical-variable demultiplexer router of the aforementioned type, for which the optical variable in question is the light wavelength λ, characterized by the use of demultiplexer components 70 produced in free space optics and comprising:

a first linear array 71 of $N_E$ collimation means (microlenses or micromirrors) that allows the $N_E$ light beams emanating from each of the incoming optical fibers 1 to be collimated with the suitable angular aperture, a linear array 72 of diffraction gratings, the lines of which are directed parallel to the axis of the linear array of incoming fibers 1 and making it possible for the various wavelengths $\lambda_1, \lambda_2, \ldots \lambda_L$ transported by each of the $N_E$ optical fibers to be spatially separated. The linear array of gratings will be inclined with respect to planes perpendicular to the optical axis of the system at an angle that depends on the angular aperture of the incident light beams and on the separation of the wavelengths of the adjacent beams diffracted by the grating, a linear array 74 of optical means for redirecting, along directions each parallel to the L light beams of wavelength $\lambda_1, \lambda_2, \ldots \lambda_L$ that are associated with each of the $N_E$ incoming optical fibers and are generated by the diffraction gratings and a matrix of refractive or reflective optical shaping means arranged in $N_E$ columns and L rows and making it possible, optionally, to match the optical characteristics of the $L \times N_E$ light beams 112 obtained to the point-to-point router 150;

a device called an optical-variable demultiplexer/multiplexer router characterized by the introduction, on the input side and on the output side of the point-to-point router described above, of a component 70 for demultiplexing the optical variables in question (wavelengths, lengths of the light pulses, polarization state, etc.) on the input side and of a component 80 for multiplexing the same variables on the output side. This device makes it possible:

thanks to the demultiplexer 70, to spatially separate the L optical variables $v_1, v_2 \ldots v_L$ transported by each of the $N_E$ incoming fibers and to generate $L \times N_E$ parallel light beams of matched optical characteristics and arranged in matrices of $N_E$ columns and L rows, each row being assigned to the same optical variable $v_1$, thanks to the point-to-point router 150, to redirect, within each of the L rows, each of the $N_E$ light beams assigned to the same optical variable $v_1$ and to generate, on the output side of the router, L rows of at least $N_S = N_E$ parallel potential beams and thanks to the multiplexer 80, to bring together these L rows into a single one and to reinject again L optical variables into any one of the outgoing fibers arranged in linear arrays, the number $N_S$ of which is at least equal to $N_E$;

a device called an optical-variable demultiplexer/multiplexer router of the aforementioned type, characterized in that the optical variable in question is the wavelength λ and in that the demultiplexers 70 and the multiplexers 80 used, produced in integrated optics, are of the AWG type, 140;

a device called an optical-variable demultiplexer/multiplexer router of the aforementioned type, characterized in that the optical variable in question is the wavelength λ and in that the demultiplexers 70 and the multiplexers 80 used, produced in free space optics, are of the type of that described above;

a device called a generalized optical-variable demultiplexer/multiplexer router characterized, as above, by the introduction, on the input side and on the output side of the point-to-point router described above, of a component 70 for demultiplexing the optical variables in question (wavelengths, lengths of the light pulses, polarization states, etc.) on the input side and of a component 80 for multiplexing the same variables on the output side, but in which:

the demultiplexer 70 makes it possible, as above, to spatially separate the L optical variables $v_1, v_2 \ldots v_L$ transported by each of the $N_E$ incoming fibers and to generate $L \times N_E$ parallel light beams 112 of matched optical characteristics and arranged in matrices of $N_E$ columns and L rows, each row being assigned to the same optical variable $v_1$, the point-to-point router 150 makes it possible to redirect, within each of the L rows, each of the $N_E$ light beams assigned to the same optical variable $v_1$ and to generate, on the output side, L rows of at least $N_S = L \times N_E$ parallel potential beams (instead of at least $N_E$ with the aforementioned point-to-point router) and the multiplexer 80 makes it possible to bring together these L rows into a single one and to reinject, into any one of the outgoing fibers arranged in linear arrays, the number $N_S$ of which is at least equal to $L \times N_E$, any number of modes assigned to the various optical variables $v_1$ lying between 1 and L (instead of L with the aforementioned point-to-point router);

a device called a generalized optical-variable demultiplexer/multiplexer router of the aforementioned type, characterized in that the optical variable in question is the wavelength λ and in that the demultiplexers 70 and the multiplexers 80 used, produced in integrated optics, are of the AWG 140 type;

a device called a generalized optical-variable demultiplexer/multiplexer router of the aforementioned type, characterized in that the optical variable in question is the wavelength λ and in that the demultiplexers 70 and the multiplexers 80 used, produced in free space optics, are of the type of that described above;

an optical routing device of any aforementioned type, characterized by the introduction of operation control means 90 placed on the output side of each of the deflection means of the various modules (APAM) involved, or only on the output side of a few particular deflection means (such as, for example, the last means $DM^{NE}$ of the input deflection subsystem of the router and the first means $DM^{1S}$ of the output subsystem of the router), and comprising:

spatial separation means 160 or 161 for removing a fraction of the light power of the optical signal beams deflected by the various deflection means or a fraction of the light power of additional optical beams superimposed on the signal beams, optical imaging means 164 for converting, in a one-to-one manner, the various angular deflection positions into the same number of spatial positions, these optical imaging means being grouped together in configurations identical to those of the deflection means (linear arrays or matrices of elements), means 165 for detecting the spatial positions thus formed, comprising a number of points at least equal to the total number of angular positions generated at the control stage in question, the configuration of the points of the photodetector being homothetic with that of the set of angular deflection positions to be controlled. These detection means may favorably be linear arrays or matrices of commercially available CMOS photodetectors and optionally, optical image matching means 166 for matching the dimensions of the components involved by the control means;

a device of the aforementioned type, characterized in that the positions of the waists of the Gaussian beams involved during the various "object-image" optical conjugation operations are located within the elements of the various deflection means; and a device of the aforementioned type, characterized by the insertion, into the module for shaping the beams, of a linear array or of a matrix of transport microlenses for shifting the position of the waists that is given by the various collimation lenses.

These control means 90 are described in detail in the patent application filed on the same day.

5. REFERENCES

"*Fully provisioned 112×112 micromechanical optical cross-connect with 35.8 Tb/s demonstrated capacity*" by D. T. Neilson et al., Optical Fiber Communication Conference, OFC 2000, Post-deadline papers, Paper PD12, Baltimore, Mar. 7–10, 2000;

"*Optical MEMS answer high-speed networking requirements*", Electronics Design, Apr. 5, 1999;

"*Laser Focus World*", January 2000, 127–129;

"*Technologies et Stratégies* [Technologies and Strategies]", Number 20, February-April 2000.

The invention claimed is:

1. An optical routing device for coupling each of a plurality $N_E$ of incoming optical channels (1) to any one of a plurality $N_S$ of outgoing optical channels (5) and for directing each of the optical beams entering via the incoming optical channels toward any of the $N_S$ outgoing optical channels, $N_E$ and $N_S$ each being an integer greater than 1, the optical routing device comprising:

an input module (40) having $N_E$ optical inputs, that is designed to shape each of the beams entering via the incoming optical channels so as to obtain a plurality of shaped optical beams (112);

an input deflection module (30) designed to generate, for each of the inputs, a number $P_{TN}$ of different angular deflection positions at least equal to the number $N_S$ of outgoing optical channels, the input deflection module comprising $N_E$ lines each having a plurality of deflection elements arranged in cascade and each able to adopt a plurality of angular deflection configurations numbering less than the number $P_{TN}$, each said deflection element being, in each line, coupled to a preceding said deflection element by an optical conjugation element designed to carry out object-to-image conjugation with a magnification G between said deflection element and the preceding said deflection element;

a linking module (50) designed to collate, in a one-to-one manner, the $P_{TN}$ angular deflection positions of each of the inputs with respect to $P_{TN}$ spatial focusing points respectively, this module being designed to generate $P_{TN}$ intermediate optical beams;

an output deflection module (35) having $P_{TN}$ inputs, that is designed to intercept the $P_{TN}$ intermediate optical beams and to generate, from the intermediate optical beams, $N_S$ output beams, the output deflection module comprising $N_S$ lines each comprising a plurality of angular deflection elements in cascade and able to adopt a plurality of angular deflection configurations numbering less than the number of $N_S$, each said deflection element being, in each line, coupled to a preceding said deflection element by an optical conjugation element designed to carry out object image conjugation with a magnification G between this deflection element and the preceding one; and an optical output module (45) designed to shape each of the $N_S$ output beams so as to be able to apply them to the $N_S$ outgoing channels.

2. The device as claimed in claim 1, characterized in that the incoming channels (1) and the outgoing channels (5) are parallel.

3. The device as claimed in claim 1, characterized in that each conjugation element associated with two consecutive deflection elements comprises at least two lenses in a cofocal configuration, the ratio of the focal lengths of which is equal to the desired magnification between the two deflection elements.

4. The device as claimed in claim 1, in which each optical conjugation element has a magnification:

$$G_{i,i+1} = P_i \times (P_{i+1} - 1)/(P_i - 1)$$

where $P_i$ and $P_{i+1}$ represent the number of angular positions that can be adopted by the i and i+1 deflection elements between which this optical conjugation element is placed.

5. The device as claimed in claim 4, in which in at least one line, the optical deflection elements have the same number of angular positions and the magnification is equal to this number.

6. The device as claimed in claim 1, in which the deflection elements are mirrors that can swivel about at least one tilt axis.

7. The device as claimed in claim 6, characterized in that the deflection elements are mirrors that can swivel in two angular positions about each tilt axis and the magnification $G_{i,i+1}$ is equal to 2.

8. The device as claimed in claim 1, in which the homologous angular deflection elements within the lines are distributed in a number of sets equal to the number of optical inputs.

9. The device as claimed in claim 8, in which the sets have parallel optical axes.

10. The device as claimed in claim 1, in which the linking module (50) includes a refractive (lens) or reflective (mirror) focusing element (55) for bringing together all the $P_{TN} \times N_E$ beams into $P_{TN}$ spatial focusing points in a single image focal plane (52).

11. The device as claimed in claim 10, in which the $N_E$ outputs of the input deflection module (30) lie in the object focal plane (51) of the focusing element of the linking module (50) and the inputs of the output deflection module (35) lie in the image focal plane of this linking module.

12. The device as claimed in claim 1, in which the linking module (50) includes optical elements (56) for increasing and optical elements (57) for decreasing the angular separations between the $P_{TN}$ angular deflection positions respectively generated by each of the outputs of the input deflection module.

13. The device as claimed in claim 1, in which the linking module (50) includes a focusing lens and a deflection mirror (300), the image focal plane $F_{IM}$ of which is coincident with the image focal plane (52) of this focusing lens.

14. The device as claimed in claim 13, having a folded configuration in which identical matrices of elements for the input and output deflection modules are used, one half of the elements of the matrices being involved in the case of the input deflection module and the other half, symmetrical with respect to the center of the various matrices, being involved in the case of the output deflection module.

15. The device as claimed in claim 1, in which the modules include optical elements arranged in linear arrays or in matrices.

16. The device as claimed in claim 1, in which the modules include optical elements of the microlens or micromirror type that can be produced by the collective fabrication processes involved in microtechnologies.

17. The device as claimed in claim 1, in which the input or output deflection elements include linear arrays or matrices of mirror elements that can be individually electrically addressed and that lie in parallel planes optionally inclined, on average, with respect to the general optical axis.

18. The device as claimed in claim 1, in which the linking module (50) has a folded configuration and includes optical angular-tilting elements (58) and (59) for bringing together the various potentially deflected beams from the outputs of the input deflection module in a plane perpendicular to the general optical axis and then carrying out the reverse operation on the various beams so as to direct them onto each of the inputs of the output deflection module.

19. The device as claimed in claim 18, in which the linking module includes at least one refractive-type focusing element (55) for working in a configuration perpendicular to the general optical axis.

20. The device as claimed in claim 18, in which the tilting means (58) and (59) comprise linear arrays or matrices of lenses or of mirrors, the focal length of the various elements forming the tilting means being calculated so that each of the optical conjugations involved has the same magnification.

21. The device as claimed in claim 1, in which the angular tilting elements (58) and (59) constitute elements (56) for increasing and elements (57) for decreasing the angular separations between the potential deflected beams involved.

22. The device as claimed in claim 1, comprising, in front of the input deflection module, a splitter component (60) for splitting the luminous power of each of the incoming channels into K equal or unequal parts and for making available a matrix of $K \times N_E$ light beams (112), each able to be directed toward any one of the outgoing channels, the number $N_S$ of which is at least equal to $K \times N_E$.

23. The device as claimed in claim 22, in which the splitter component is produced in integrated optics.

24. The device as claimed in claim 22, in which the splitter components are produced in free-space optics and comprise:

a first linear array (61) of $N_E$ collimation means (lenses or mirrors) that makes it possible to collimate the $N_E$ light beams emanating from each of the incoming optical channels (1) along the direction of the axis of the linear array; p1 a second linear array (62) of $N_E$ reflective or refractive collimation means for collimating the $N_E$ light rows formed; and a matrix (63) of $K \times N_E$ optical, refractive or reflective, shaping elements for generating, from the $N_E$ light rows, $K \times N_E$ light beams (112) having optical characteristics matched to the input deflection module.

25. The device as claimed in claim 1, comprising, in front of the input deflection module, a demultiplexer component (70) for splitting the L optical variables that can be used as transported data medium, the connection of this component with each of the optical channels of a linear array of $N_E$ incoming optical fibers 1 making it possible to generate $L \times N_E$ light beams (112) that are applied to the input deflection module, the number $N_S$ being at least equal to $L \times N_E$.

26. The device as claimed in claim 25, in which the demultiplexer component (70) is produced in integrated optics.

27. The device as claimed in claim 25, in which the component is designed to split the light wavelength λ and is produced in integrated optics.

28. The device as claimed in claim 25, in which the component is designed to split the light wavelength λ and is produced in free-space optics and comprises:

a first linear array (71) of $N_E$ collimation means (lenses or mirrors) for collimating the $N_E$ light beams emanating from each of the incoming optical channels (1) with the matched angular aperture;

a linear array (72) of diffraction gratings composed of lines oriented parallel to the axis of the linear array of incoming channels (1) and making it possible for the various wavelengths $\lambda_1, \lambda_2, \ldots \lambda_L$ transported by each of the $N_E$ incoming optical channels to be split spatially, the linear array of gratings being inclined with respect to planes perpendicular to the optical axis of the system at an angle that depends on the angular aperture of the incident light beams and on the separation of the wavelengths of the adjacent beams diffracted by the grating;

a linear array (74) of optical means for redirecting, along directions each parallel to the L light beams of wavelength $\lambda_1, \lambda_2, \ldots \lambda_L$ attached to each of the $N_E$ incoming optical channels and generated by the diffraction grating; and a matrix of optical, refractive or reflective, shaping means arranged in $N_E$ columns and L rows and making it possible to optionally match the optical characteristics of the $L \times N_E$ light beams (112) obtained to the input deflection module.

29. The device as claimed in claim 1, comprising, in front of the input deflection module and behind the output deflection module respectively, a demultiplexing component (70) for optical variables as input and a multiplexing component (80) for the same variables as output.

30. The device as claimed in claim 29, characterized in that the optical variable in question is the wavelength $\lambda$ and in that the demultiplexers (70) and the multiplexers (80) used are produced in integrated optics.

31. The device as claimed in claim 29, characterized in that the optical variable in question is the wavelength $\lambda$ and in that the demultiplexers (70) and the multiplexers (80) used are produced in free-space optics.

32. The device as claimed in claim 1, designed for the demultiplexing/multiplexing of optical variables, characterized by the presence of a component for demultiplexing these variables that is placed in front of the input deflection module and of a component for multiplexing these variables that is placed behind the output deflection module, and characterized in that:

the demultiplexer (70) makes it possible to spatially split L optical variables $v_1, v_2 \ldots v_L$ transported by each of the $N_E$ incoming channels and of generating $L \times N_E$ parallel light beams (112) having matched optical characteristics and arranged in matrices of $N_E$ columns and L rows, each row being attached to the same optical variable $v_1$;

makes it possible to redirect, within each of the L rows, each of the $N_E$ light beams attached to the same optical variable $v_1$ and to generate, as output from the output deflection module, L rows of at least $N_S$ ($=L \times N_E$) potential beams; and the multiplexer (80) brings together these L rows into a single row and reinjects, into any of the outgoing channels arranged in linear arrays, and the number $N_S$ of which is at least equal to $L \times N_E$, any number of channels attached to the various optical variables $v_1$ that lies between 1 and L.

33. The device as claimed in claim 32, characterized in that the optical variable in question is the wavelength $\lambda$ and in that the demultiplexers (70) and the multiplexers (80) used are produced in integrated optics.

34. The device as claimed in claim 32, characterized in that the optical variable in question is the wavelength $\lambda$ and in that the demultiplexers (70) and the multiplexers (80) used are produced in free-space optics.

35. The device as claimed in claim 1, in which operating control elements are placed on the output side of at least part of the input deflection module or of the output module, these control elements comprising spatial splitting elements for taking off some of the beams.

36. The device as claimed in claim 1, characterized in that the beams involved during the "object-image" optical conjugation operations have waists whose positions are located at the elements of the deflection elements.

37. The device as claimed in claim 1, characterized in that the collimation lenses give the beams a waist and in that a module for shaping the beams from a linear array or from a matrix of transport microlenses is provided that allows the position of the waists to be shifted.

38. The device as claimed in claim 1, characterized in that the incoming and outgoing channels are fibers.

39. The device as claimed in claim 1, characterized in that it includes an additional conjugation element or set of conjugation elements that is placed between the input deflection module and the linking module and/or between the output deflection module and the linking module.

* * * * *

UNITED STATES PATENT AND TRADEMARK OFFICE
CERTIFICATE OF CORRECTION

PATENT NO. : 7,031,611 B2
DATED : April 18, 2006
INVENTOR(S) : Serge Valette

It is certified that error appears in the above-identified patent and that said Letters Patent is hereby corrected as shown below:

<u>Title page,</u>
Item [30], Foreign Application Priority Data, should read
-- Mar. 2, 2001  (FR) ……………………………..01/02922 --.

Signed and Sealed this

Thirteenth Day of June, 2006

JON W. DUDAS
*Director of the United States Patent and Trademark Office*